US010856050B2

(12) United States Patent
Saxena et al.

(10) Patent No.: US 10,856,050 B2
(45) Date of Patent: Dec. 1, 2020

(54) MATCHING AND RANKING CONTENT ITEMS

(71) Applicant: Facebook, Inc., Menlo Park, CA (US)

(72) Inventors: Sanchan Sahai Saxena, Milpitas, CA (US); Sergey Markov, Menlo Park, CA (US); Fei Wang, San Francisco, CA (US); Yi-Wei Wu, Mountain View, CA (US); Ed Ignatius Tanghal Salvana, San Francisco, CA (US); William Taube Schurman, Palo Alto, CA (US); Youssef Ahres, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 16/297,276

(22) Filed: Mar. 8, 2019

(65) Prior Publication Data

US 2019/0215574 A1 Jul. 11, 2019

Related U.S. Application Data

(63) Continuation of application No. 15/488,739, filed on Apr. 17, 2017, now Pat. No. 10,277,950.

(51) Int. Cl.
*H04N 21/478* (2011.01)
*G06Q 50/00* (2012.01)
(Continued)

(52) U.S. Cl.
CPC ... *H04N 21/47815* (2013.01); *G06K 9/00677* (2013.01); *G06Q 30/00* (2013.01);
(Continued)

(58) Field of Classification Search
CPC ......... H04N 21/47815; G06K 9/00677; G06Q 50/01
See application file for complete search history.

(56) References Cited

U.S. PATENT DOCUMENTS 8,497,859 B1 7/2013 Hickman et al.
9,553,922 B1 1/2017 Guarraci et al.
(Continued)

OTHER PUBLICATIONS

U.S. Appl. No. 15/488,739, Nov. 1, 2017, Office Action.
(Continued)

*Primary Examiner* — Robert J Hance
(74) *Attorney, Agent, or Firm* — Keller Jolley Preece

(57) ABSTRACT

The present disclosure is directed to a networking system that provides a user experience in which users of the networking system can interact with user-generated digital content items to select and receive information about one or more products. In particular, the systems and methods involve identifying products shown within user-generated digital content items and associating the user-generated digital content items with the identified products. In addition, where a user selects a product shown within a digital content item, the systems and methods involve selectively identifying other user-generated digital content items for the user based on a coefficient between the user and the other user-generated digital content items. Moreover, the systems and methods involve tracking user-interactions with respect to digital content items and generating and providing a creation insight including an identification of one or more products predicted to engage users of the networking system.

20 Claims, 15 Drawing Sheets

(51) Int. Cl.
  *H04N 21/45*     (2011.01)
  *H04N 21/466*    (2011.01)
  *G06K 9/00*      (2006.01)
  *H04N 21/431*    (2011.01)
  *H04N 21/4722*   (2011.01)
  *G06Q 30/00*     (2012.01)
  *H04N 21/4788*   (2011.01)
  *H04N 21/81*     (2011.01)
  *G06Q 30/02*     (2012.01)
  *G06Q 30/06*     (2012.01)

(52) U.S. Cl.
  CPC ..... *G06Q 30/0241* (2013.01); *G06Q 30/0277* (2013.01); *G06Q 30/0601* (2013.01); *G06Q 50/01* (2013.01); *H04N 21/4312* (2013.01); *H04N 21/4532* (2013.01); *H04N 21/4667* (2013.01); *H04N 21/4722* (2013.01); *H04N 21/4788* (2013.01); *H04N 21/812* (2013.01)

(56) References Cited

U.S. PATENT DOCUMENTS

| | | | |
|---|---|---|---|
| 9,569,700 B1 | 2/2017 | Santos et al. | |
| 9,811,810 B1* | 11/2017 | Ranganath | G06Q 40/02 |
| 10,534,851 B1* | 1/2020 | Chan | G06Q 30/0255 |
| 2003/0131357 A1 | 7/2003 | Kim | |
| 2009/0106085 A1* | 4/2009 | Raimbeault | G06Q 30/0631 |
| | | | 705/14.44 |
| 2010/0262477 A1* | 10/2010 | Hillerbrand | G06Q 30/02 |
| | | | 705/14.16 |
| 2011/0040760 A1 | 2/2011 | Fleischman et al. | |
| 2012/0076367 A1 | 3/2012 | Tseng | |
| 2012/0158551 A1* | 6/2012 | Gonsalves | G06Q 30/0641 |
| | | | 705/27.2 |
| 2012/0192227 A1 | 7/2012 | Fleischman et al. | |
| 2013/0013416 A1 | 1/2013 | Stein | |
| 2013/0114864 A1* | 5/2013 | Garcia | H04N 21/252 |
| | | | 382/118 |
| 2013/0139048 A1* | 5/2013 | Dhawan | G06Q 30/0278 |
| | | | 715/234 |
| 2013/0268591 A1 | 10/2013 | Chen et al. | |
| 2014/0032332 A1* | 1/2014 | Atli | G06Q 50/01 |
| | | | 705/14.66 |
| 2014/0089067 A1 | 3/2014 | Filev et al. | |
| 2014/0089124 A1* | 3/2014 | Jha | G06F 16/903 |
| | | | 705/26.3 |
| 2014/0279068 A1 | 9/2014 | Systrom et al. | |
| 2015/0019345 A1 | 1/2015 | Masuko | |
| 2015/0019346 A1 | 1/2015 | Masuko | |
| 2015/0067061 A1* | 3/2015 | Poston | H04L 67/20 |
| | | | 709/204 |
| 2015/0186985 A1* | 7/2015 | Alcott | G06Q 30/0643 |
| | | | 705/7.29 |
| 2016/0005070 A1* | 1/2016 | Burr | G06Q 30/0635 |
| | | | 705/14.51 |
| 2017/0024388 A1 | 1/2017 | Bentley et al. | |
| 2017/0220580 A1 | 8/2017 | Chi et al. | |
| 2018/0302682 A1 | 10/2018 | Saxena et al. | |

OTHER PUBLICATIONS

U.S. Appl. No. 15/488,739, Apr. 11, 2018, Office Action.
U.S. Appl. No. 15/488,739, Sep. 20, 2018, Office Action.
U.S. Appl. No. 15/488,739, Dec. 26, 2018, Notice of Allowance.

* cited by examiner

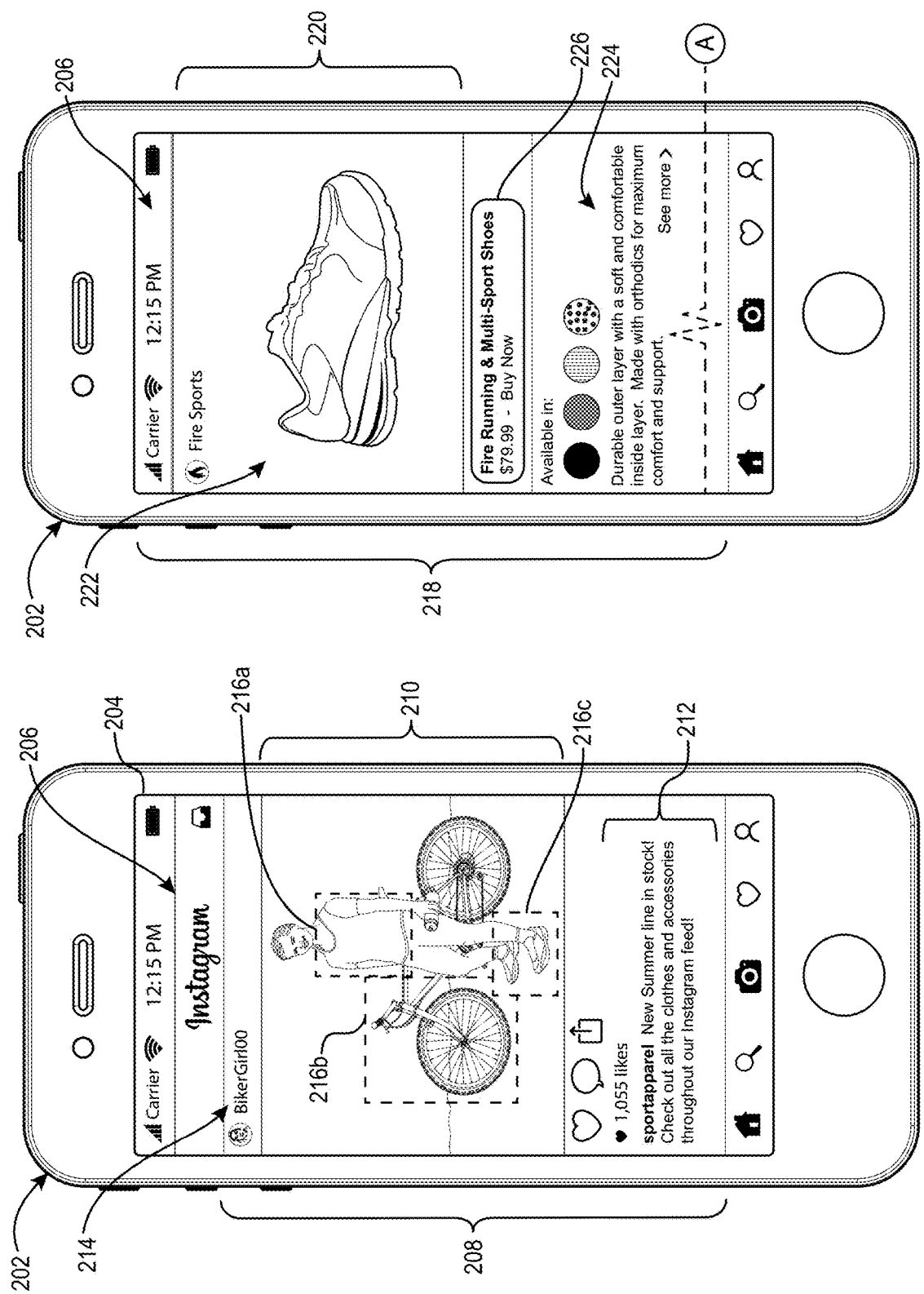

MATCHING AND RANKING CONTENT ITEMS

CROSS REFERENCE TO RELATED APPLICATIONS

This application is a continuation of and claims priority to U.S. patent application Ser. No. 15/488,739, filed Apr. 17, 2017, which is hereby incorporated by reference in its entirety.

BACKGROUND

Communication systems allow users to connect and communicate with other users. Indeed, a user of a communication system, such as a social networking system, may create a profile accessible via the communication system that corresponds to a user identity and enables the user to follow other users, view digital content originating from other users, and otherwise engage in a user experience with other users of the communication system. Because of the increasing popularity of online communication and networking, as well as the increasing amount of digital media shared via users of various communication systems, a communication system (e.g., a social networking system) provides an ideal forum for merchants, marketers, and other entities to increase awareness and boost sales for products and services. In addition, communication systems provide an ideal forum for users to receive information and inquire about various products and services.

Many merchants increase awareness by distributing digital media (e.g., images, videos) to users of conventional communication systems. For example, many merchants provide digital media via sponsored advertisements delivered or otherwise made available to users of the communication system. In addition, many merchants enlist third-party users (e.g., influencers) to provide images and videos to further engage users of the communication system and increase awareness about various products and services. Conventional systems for increasing awareness via distributed digital media, however, has various drawbacks and limitations.

For example, conventional communication systems often fail to provide an effective way for viewers of digital media to learn more information about products shown within digital media. For instance, where a user views or otherwise receives a photo (or other digital media) in which an article of clothing is shown, a viewer of the photo often fails to immediately recognize the brand or model of the article of clothing. As a result, the viewer often expends considerable effort to learn more about the article of clothing by sending a message to an originator of the digital media or, alternatively, searching for the article of clothing via third-party websites.

In addition conventional methods for raising product awareness often fail to provide a user experience that enables users to conveniently purchase the product shown within digital media. For example, while conventional techniques for delivering digital media generally involve providing a photo or video in which a product appears, in order to purchase the product, users typically visit a store associated with the product at a later time or navigate to a third-party website associated with the merchant in order to purchase the product. As such, users often forget about the product or, alternatively, experience frustration when switching between websites that provide substantially different user experiences.

Further, merchants and other providers of digital media often fail to provide digital media that realistically represents products (e.g., goods and/or services) to typical users of the communication system. As an example, in order to portray an article of clothing in the best possible light, a merchant may professionally produce a video in which a particular clothing ensemble is shown by a model in a controlled environment (e.g., a professional photo-shoot). While professionally produced media effectively shows a positive side of the product as the merchant wants the product to appear, many consumers hesitate to purchase clothing or other products without seeing how the product appears or is used under normal circumstances and by a variety of individuals.

In addition, merchants often fail to deliver digital media that effectively engages individual users of the communication system. In particular, even where a merchant produces digital media that shows different ways of how a product appears or how it may be used, merchants are still limited in what digital media is provided as well as how the digital media is delivered to particular users. For example, merchants are often limited to providing digital media delivered directly from the merchant. In addition, merchants are often limited to distributing digital media produced by or otherwise originating from the merchant. As such, merchants often fail to provide digital media that effectively engages individual users of the communication system.

Moreover, merchants often fail to predict which products shown within digital media will maximize engagement of users of the communication system and ultimately result in end-users purchasing corresponding products. For example, while many merchants gather information about customers and purchased products, merchants nevertheless experience difficulty identifying content (e.g., products) to include within digital media that will positively influence users to engage with and eventually purchase an associated product. As such, merchants often provide fail to deliver digital media that maximize engagement by users of the communication system.

These and other problems exist with regard to providing a positive user experience with regard to providing digital content items that enable users to interact with and receive information about products shown therein.

BRIEF SUMMARY

One or more embodiments described herein provide benefits and/or solve one or more of the foregoing or other problems in the art with systems and methods for identifying products (from a product catalog) within digital content items and providing digital content items to users based on the identified products therein. For example, systems and methods described herein provide a user experience in which users of a networking system (e.g., social networking system) can interact directly with digital content items to select a product (e.g., an article of clothing) shown within the digital content item and view information associated with the product. In addition, systems and methods described herein enable a user to purchase the selected product from the digital content item via an associated graphical user interface of the networking system.

The disclosed systems and methods enable a user to conveniently receive or otherwise obtain information about products shown within digital content. For example, the disclosed systems and methods enable users of a networking system to interact with digital content items having products shown therein to receiving information about various products. In particular, the disclosed systems and methods identify products shown within user-generated digital content items and further enable a viewer of the user-generated digital content items to select the identified products to view additional information about the product.

In addition, the disclosed systems and methods identify and provide user-generated digital content that engages users by providing a realistic representation of various products. In particular, the systems and methods disclosed herein provide user-generated digital content items posted by various users of the networking system that include identified products therein. This realistic portrayal of products is accomplished by detecting objects within user-generated digital content items and determining a confidence score associated with a likelihood that the detected objects correspond to respective products from a product catalog (e.g., collection of goods and/or services). Based on determined confidence scores, the described systems and methods associate user-generated digital content items with products from the catalog. The described systems and methods further provide a graphical user interface including an immersive view of a particular product (e.g., a user-selected product). Within the immersive view, the described systems and methods provide any number of user-generated digital content items (e.g., from a variety of users) associated with the particular product.

Furthermore, in one or more embodiments, the disclosed systems and methods effectively engage users of the networking system by selectively identifying user-generated digital content items for a specific user and presenting the selectively identified user-generated digital content items to the specific user. In particular, the systems and methods disclosed herein include detecting a selection of a product (e.g., from a product catalog) within a digital content item and providing, to a user, a graphical user interface including an immersive view for the selected product. In addition, the systems and methods described herein involve determining compatibility scores between the user and a plurality of user-generated digital content items in which the selected product has been identified. The systems and methods further include identifying user-generated digital content items from the plurality of user-generated digital content items based on the compatibility scores and further presenting the identified user-generated digital content items in accordance with the compatibility scores.

Moreover, in one or more embodiments, the disclosed systems and methods generate and provide creation insights (e.g., post creation insights) including identifications of various products predicted to maximize engagement of users of the social networking system. For example, in one or more embodiments, the systems and methods disclosed herein receive posts (e.g., social networking posts) including digital content items and identify various products (e.g., from a product catalog) within the digital content items. The described systems and methods track interactions by users of the networking system with respect to the posts to determine engagement scores for the plurality of products from the product catalog. Based on the engagement scores, the disclosed systems and methods generate a creation insight including an identification of one or more products from the product catalog predicted to engage users of the networking system. In this way, merchants and influencers can provide digital content that maximizes engagement by users of the social networking system, effectively boosting awareness of particular products and boosting sales of those products.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited systems and methods provide various advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which:

FIG. 2A illustrates an example graphical user interface for selecting a product shown in a digital content item in accordance with one or more embodiments;

FIGS. 2B-2D illustrates an example graphical user interface including an immersive view for a selected product in accordance with one or more embodiments;

DETAILED DESCRIPTION

Figure 1:
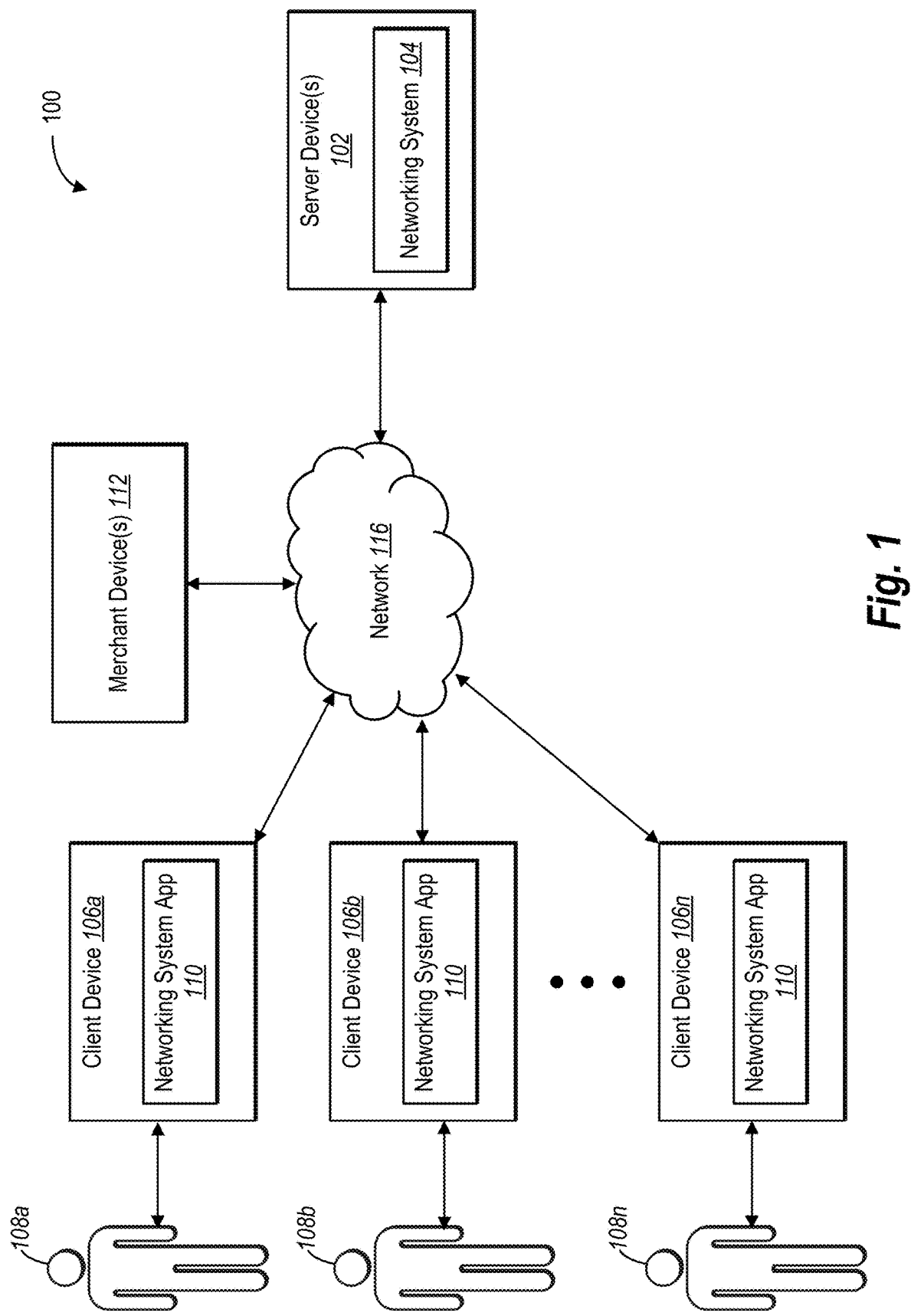
FIG. 1 illustrates a block diagram of an environment in which a networking system is implemented in accordance with one or more embodiments.

One or more embodiments described herein include a networking system (e.g., a social networking system) that provides a user experience in which users of the networking system can interact with user-generated digital content (e.g., digital content generated or otherwise provided by users of the networking system) to select and receive information associated with one or more products (e.g., goods and/or services) shown within the user-generated digital content. In particular, in one or more embodiments, the networking system enables users to interact with user-generated digital content items to select products shown therein and view information associated with the selected products. The networking system further enables users to purchase the selected products via a graphical user interface provided by the networking system. In addition, as described herein, the networking system provides features and functionality that improve the experience of users of the networking system to interact with products shown within digital content items.

In one or more embodiments, the networking system enables users to conveniently receive information about various products by identifying products (from a product catalog) shown within digital content items. In particular, in one or more embodiments, the networking system receives a user-generated digital content item (e.g., via a social networking post) and detects an object within the user-generated digital content item. The networking system determines a confidence score associated with a likelihood that the detected object corresponds to a product from a product catalog including a collection of products and associated information. In particular, the networking system determines the confidence score based on various factors, as will be described in further detail below. Based on the confidence score, the networking system can associate the user-generated digital content item with the product from the product catalog. As will be described in further detail below, the networking system can identify any number of products within digital content items and associate the digital content items with products from the product catalog.

The networking system further provides a realistic representation of various products shown within digital content items by providing digital content items associated with the various products to a user of the networking system. For example, in one or more embodiments, in response to receiving a user selection of a product shown within a digital content item, the networking system provides a graphical user interface including an immersive view (e.g., a viewer or interface within the graphical user interface of the networking system) for the selected product. In particular, in one or more embodiments, the networking system provides any number of user-generated digital content items associated with the product within the immersive view.

Furthermore, the networking system individually engages users of the networking system by selectively identifying digital content items associated with various products for a user and providing the identified digital content items to the user (e.g., within the immersive view of the graphical user interface). For example, in one or more embodiments, the networking system detects a user selection of a product within a digital content item. In response to the user selection, the networking system identifies a plurality of digital content items associated with the selected product (e.g., user-generated digital content items posted by various users of the networking system) and determines a compatibility score between the user and the respective digital content items based on various compatibility factors, as will be described in further detail below. The networking system further provides the graphical user interface including the immersive view for the identified product and provides, within the immersive view, one or more of the identified digital content items ranked or otherwise organized based on the determined compatibility scores.

Moreover, in one or more embodiments, the networking system increases engagement of users of the networking system by providing creation insights for various entities (e.g., merchants, influencers, etc.) of the networking system. The networking system provides the creation insights by identifying products to include within digital content items. In particular, in one or more embodiments, the networking system identifies products to include within a digital content item predicted to engage users of the networking system. For example, in one or more embodiments, the networking system receives a plurality of posts including digital content items and including various products from a product catalog identified therein. The networking system further tracks interactions by users of the networking system with respect to the posts and determines engagement scores for the various products based on the tracked interactions. Based on the determined engagement scores, the networking system generates a creation insight including an identification of one or more products predicted to engage users of the networking system (e.g., if included within a post).

Embodiments described herein provide a number of advantages over conventional communication systems for distributing digital media to users of the communication system. For example, in one or more embodiments, the networking system enables users to interact with user-generated digital content items by selecting products identified therein and immediately receive additional information about the selected product. By enabling users to interact directly with digital content items and receive immediate access to product information, the networking system provides a positive user experience and avoids causing users to forget about or delay purchasing products in which they have a genuine interest.

In addition, the networking system provides a realistic representation of products shown within digital content by identifying and providing user-generated digital content items from various users of the networking system. In this way, the networking system enables users to construct opinions about products based on real-life examples of how a product is used rather than based on a narrow or limited representation provided directly from a merchant, influencer, or other entity directed associated with the product.

Furthermore, the networking system engages users by providing an individualized presentation including user-generated content items selectively identified for a particular user. For example, the networking system provides any number of user-generated digital content items in accordance with a ranking determined for an individual user of the networking system. By providing an individualized presentation, the networking system better engages users and further enhances the user experience by grabbing the attention of the user with respect to selected products shown via the networking system.

Moreover, the networking system enables merchants, influencers, or other distributors of digital content to effectively engage users of the networking system by providing creation insights including identified combinations of products predicted to maximize engagement of users of the networking system. In this way, merchants, influencers, and others can take advantage of resources provided by the networking system to better engage users of the networking system and positively raise awareness about various products.

Additional detail will now be provided regarding an example environment including the networking system implemented therein. For example, FIG. 1 illustrates a schematic diagram illustrating an example communication environment 100 for performing the processes and features described herein. As illustrated in FIG. 1, the communication environment 100 includes a server device 102 including a networking system 104 thereon. The communication environment 100 additionally includes client devices 106*a-n* associated with respective users 108*a-n* and each having a networking system application 110 thereon. The communication environment 100 further includes one or more merchant device(s) 112. In one or more embodiments, the merchant device(s) has one or more associated users (e.g., an administrative user of an account of the networking system 104 associated with the merchant).

As shown in FIG. 1, each of the server device(s) 102, client devices 106*a-n*, and merchant device(s) 112 can communicate over a network 116, which may include one or multiple networks and may use one or more communication platforms or technologies suitable for transmitting data. In one or more embodiments, the network 116 includes the Internet or World Wide Web. In addition, or as an alternative, the network 116 can include various other types of networks that use various communication technologies and protocols. Additional details relating to the network 116 are explained below in reference to FIG. 11.

Although FIG. 1 illustrates a particular number and arrangement of client devices 106*a-n*, and merchant device(s) 112. It will be understood that one or more of the devices may directly communicate with the networking system 104 or via an alternative communication network, bypassing the network 116. Further, in one or more embodiments, the communication environment 100 includes any number of client devices 106*a-n* and merchant device(s) 112.

In one or more embodiments, the client devices 106*a-n* and merchant device(s) 112 can refer to various types of computing devices. For example, one or more of the devices may include a mobile device such as a mobile telephone, a smartphone, a PDA, a tablet, or a laptop. Additionally, or alternatively, one or more of the devices may include a non-mobile device such as a desktop computer, a server, or another type of computing device. Additional detail with regard to different types of computing devices is described in reference to FIG. 10.

As mentioned above, the networking system 104 can refer to various types of networking systems including, for example, a social networking system, an electronic messaging system, or other type of networking system over which a community of users can share and access digital content items. As such, while one or more examples described herein refer specifically to a social networking system, it will be understood that features and functionality described in connection with a social networking system can similarly apply to other types of networking systems. Additional detail with regard to the networking system 104, and particularly an example social networking system, is described below in connection with FIG. 12.

In addition, as shown in FIG. 1, each of the client devices 106*a-n* include a networking system application 110 thereon. In one or more embodiments, the networking system application 110 (e.g., a social networking system application) refers to a software application associated with the networking system 104. In one or more embodiments, the networking system application 110 provides and controls various features and functionality on the client devices 106*a-n* to enable respective users 108*a-n* of the client devices 106*a-n* to receive, view, and interact with digital content items provided by the networking system 104. In one or more embodiments, the networking system application 110 is a native application on a respective computing device. Alternatively, in one or more embodiments, the networking system application 110 refers to a web browser used to access the networking system 104 (e.g., a website associated with the networking system 104 provided via a web browser on a respective computing device). In one or more embodiments, the merchant device 112 similarly includes a networking system application 110 similar to the network system applications 108 shown on the client devices 106*a-n*.

In one or more embodiments, the communication environment 100 enables users of the networking system 104 to share digital content items with other users of the networking system 104. As used herein, a "user," "co-user," or "member" of the networking system 104 refers interchangeably to any user, merchant, influencer, or other entity having the capability to view digital content from other users of the networking system 104 and share digital content items with other users of the networking system 104. For example, a user may refer to any entity (e.g., users 108*a-n*, merchant account administrator) having an account and/or profile registered with the networking system 104 and which enables an associated user to share digital content items with other users as well as view digital content items shared by other users of the networking system 104.

In addition, as used herein, a "digital content item" or "digital content" refers to a defined portion of digital data (e.g., a data file) including, but not limited to, digital images, digital video files, and/or folders that include one or more digital content items. In one or more embodiments described herein, a digital content item refers to a digital image or other digital media posted to the networking system 104 by any user of the networking system 104. In one or more embodiments described herein, a digital content item refers to a user-generated digital content item.

As used herein, a "user-generated digital content item" refers to a digital content item posted, shared, or otherwise originating from an account of a user of the networking system 104 unaffiliated with or otherwise acting independently from a merchant or brand of an associated product. For example, a user-generated digital content item can refer to an image, video, or other type of digital content item captured by or stored on one of client devices 106*a-n* and shared with the networking system 104 by users 108*a-n* using the client devices 106*a-n*. Alternativelu a digital content item other than a user-generated digital content item may refer to an image, video, or other type of digital content item originating from an account affiliated with (e.g., acting on behalf of) a merchant or brand of a product and operated by, for example, an account administrator associated with the merchant or brand of the product.

As an example of sharing digital content between users of the networking system 104, a first user 108*a* can post a user-generated digital content item by providing (e.g., uploading) a locally stored image on the first client device 106*a* to the networking system 104 on the server device(s) 102. In accordance with preferences of the first user 108*a* (e.g., user-profile and/or privacy settings), the networking system 104 can provide access to one or more users of the networking system 104 including, for example, a second user 108b associated with second client device 106b. Alternatively, in one or more embodiments, the networking system 104 restricts access from various users of the networking system 104 in accordance with privacy settings or other restrictions set by the first user 108a. It will be understood that any of the users 108a-n, merchants, or other entities having access to the networking system 104 can similarly post digital content items to the networking system 104 to be accessible to any number of users of the networking system 104 associated with the respective content creator (e.g., sharer) of the digital content item.

In addition, as will be described in further detail below, in one or more embodiments, the networking system 104 associates digital content items with products from a products catalog. For example, in one or more embodiments, the networking system 104 maintains or otherwise accesses a products catalog including any number of products associated with various merchants. In one or more embodiments, the networking system 104 identifies various products shown within digital content items and associates the digital content items with the identified products from the product catalog. As discussed in further detail below, the networking system 104 can associate a given digital content item with any number of products from the product catalog.

Additional detail will now be given with respect to example graphical user interfaces provided by the networking system 104 that enable users of the networking system 104 to view and interact with digital content items provided by the networking system 104. For example, as shown in FIGS. 2A-6B, a mobile device 202 includes a touch screen display 204. The mobile device 202 provides a social networking system graphical user interface 206 (or simply "system interface 206") including a display of a user profile, social networking posts, digital content items, immersive views, and other content associated with the networking system 104. In particular, the system interface 206 can refer to any graphical user interface provided by the networking system 104 and provided to a user via a display of a client device (e.g., mobile device 202). For example, in one or more embodiments, the system interface 206 includes to one or multiple graphical user interfaces (e.g., profile display, immersive view for a selected product, shopping interface) provided via a networking system application 110 on the mobile device 202 and based on information provided by the networking system 104.

In addition, as described herein, features and functionality described with regard to the mobile device 202 can apply to one or more of the client devices 106a-n and/or merchant device(s) 112. Thus, unless indicated otherwise, features and functionality described in connection with a system interface 206 displayed via the mobile device 202 can similarly apply to a graphical user interface (GUI) displayed on a client device, merchant device, or other computing device (e.g., desktop, laptop, smartphone) associated with a user of the networking system 104.

As an overview, FIGS. 2A-2D illustrate example GUIs associated with enabling a user to interact with a digital content item to select a product shown therein and receive information via an immersive view associated with the selected product. In addition, FIGS. 3A-3C illustrate example GUIs associated with identifying objects shown within digital content items and associating the identified objects with products from a product catalog. Further, FIGS. 4A-4D illustrate an example embodiment in which the networking system 104 provides an immersive view of a selected product shown within a digital content item including user-generated digital content items selected and organized within the immersive view for a particular user. FIG. 5A-5B illustrate an example embodiment in which the networking system 104 provides a creation insight interface including one or more identified products predicted to engage users of the networking system 104.

As shown in FIG. 2A, the system interface 206 includes a social networking post 208. The social networking post 208 includes a user-generated digital content item 210 and interaction information 212 associated with the user-generated digital content item 210 including, for example, one or more comments and user-ratings (e.g., likes) associated with the user-generated digital content item 210. As used herein, a "user-rating" refers to a rating for a digital content item or networking post based on a user-selection of a rating icon. For example, a user-rating may refer to a positive, negative, or neutral reaction to a post by a user as indicated by a user-selected like icon, laugh icon, love icon, sad icon, or other selectable option corresponding to a user-reaction.

As further shown in FIG. 2A, the system interface 206 includes a user identifier 214 (e.g., user name) of "bikergirl00" associated with a user of the networking system 104 who shared or otherwise posted the user-generated digital content item 210 to the networking system 104. In one or more embodiments, the system interface 206 is provided by a networking system application 110 on the mobile device 202.

In one or more embodiments, the user associated with the username "bikergirl00" captures or otherwise accesses the user-generated digital content item 210 from an associated client device and provides the user-generated digital content item 210 to the networking system 104 to be shared with other users of the networking system 104. In turn, the networking system 104 enables any number of users (e.g., followers of "bikergirl00") of the networking system 104 to view the shared user-generated digital content item 210 (e.g., through a profile page of "bikergirl00") The system interface 206 further includes interaction icons (e.g., heart icon, comment icon, share icon) that enable a user of the mobile device 202 to add a user-rating (e.g., like), add a comment, and/or share the user-generated digital content item 210 with other users of the networking system 104. As shown in FIG. 2A, the system interface 206 includes interaction information 212 that reflects one or more interactions (e.g., likes, comments) by the user of the mobile device 202 with respect to the user-generated digital content item 210.

The system interface 206 shown in FIG. 2A additionally includes objects shown therein. For example, the system interface 206 includes a first object 216a (a shirt), a second object 216b (a bike) and a third object 216c (a shoe). In one or more embodiments, the networking system 104 identifies the objects 216a-c by analyzing the user-generated digital content item 210 to detect the objects 216a-c. In addition, in one or more embodiments, the networking system 104 further identifies products from a product catalog corresponding to the detected objects 216a-c.

The networking system 104 can detect the objects 216a-c and associate the detected objects with products based on various factors. In particular, in one or more embodiments, the networking system 104 determines a confidence score associated with a likelihood that the detected object corresponds with a particular product from a product catalog. For example, the networking system 104 can determine a confidence score based on an analysis of a display of the object within the user-generated digital content item 210 (e.g., visual characteristics). As another example, the networking system 104 determines a confidence score based on interactions associated with the user-generated digital content item 210 (e.g., comments within a social networking post) As another example, the networking system 104 can determine a confidence score based on follows, purchases, and other information associated with the user who created and/or originally shared the user-generated digital content item 210 (or a user tagged within the user-generated digital content item 210). In one or more embodiments, the networking system 104 determines a confidence score based on one or more tags by one or more users of the networking system 104 naming or otherwise identifying a product corresponding to the detected object. Additional details and examples in connection with detecting an object and determining a corresponding product for the detected object will be provided in connection with FIGS. 3A-3C.

In one or more embodiments, the networking system 104 provides an immersive view including information about the product corresponding to the selected object. For example, a user of the mobile device 202 can touch a display of the user-generated digital content item 210 at a location of a detected object to select a product from a product catalog corresponding to the object. In response to detecting the selection of the product, the networking system 104 provides an immersive view including additional information about the product. In particular, in one or more embodiments, the networking system 104 accesses information provided by a merchant of the product and provides an immersive view within the system interface 206 including the information about the product. As used herein, and as will be described in further detail in connection with FIGS. 2A-6B, an "immersive view" refers to an interface of the networking system 104 (e.g., a GUI provided on the mobile device 202 via a networking system application 110) including information about a selected product.

Figure 2D:
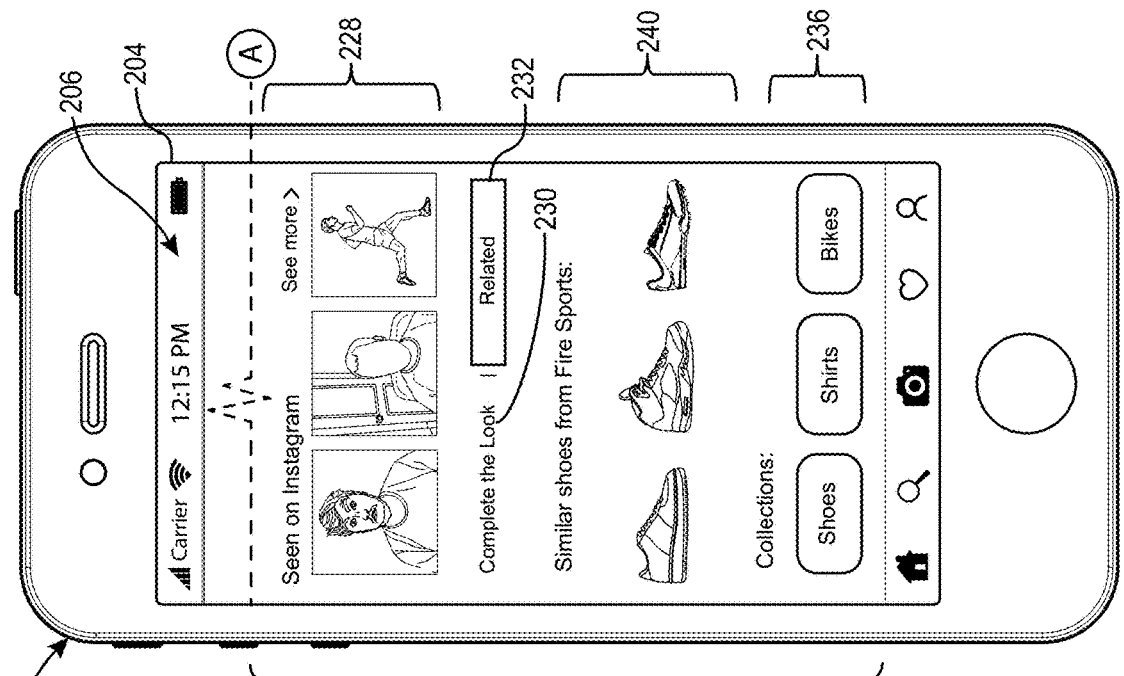
Figure 2C:
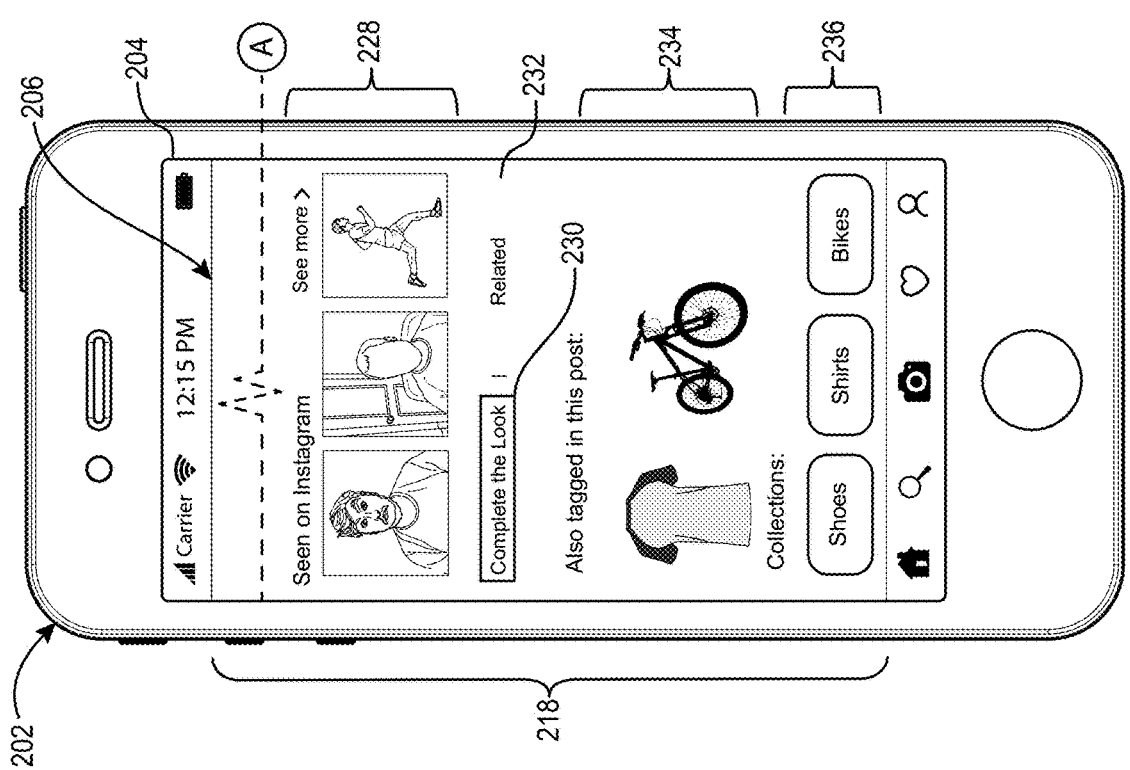
Figure 3B:
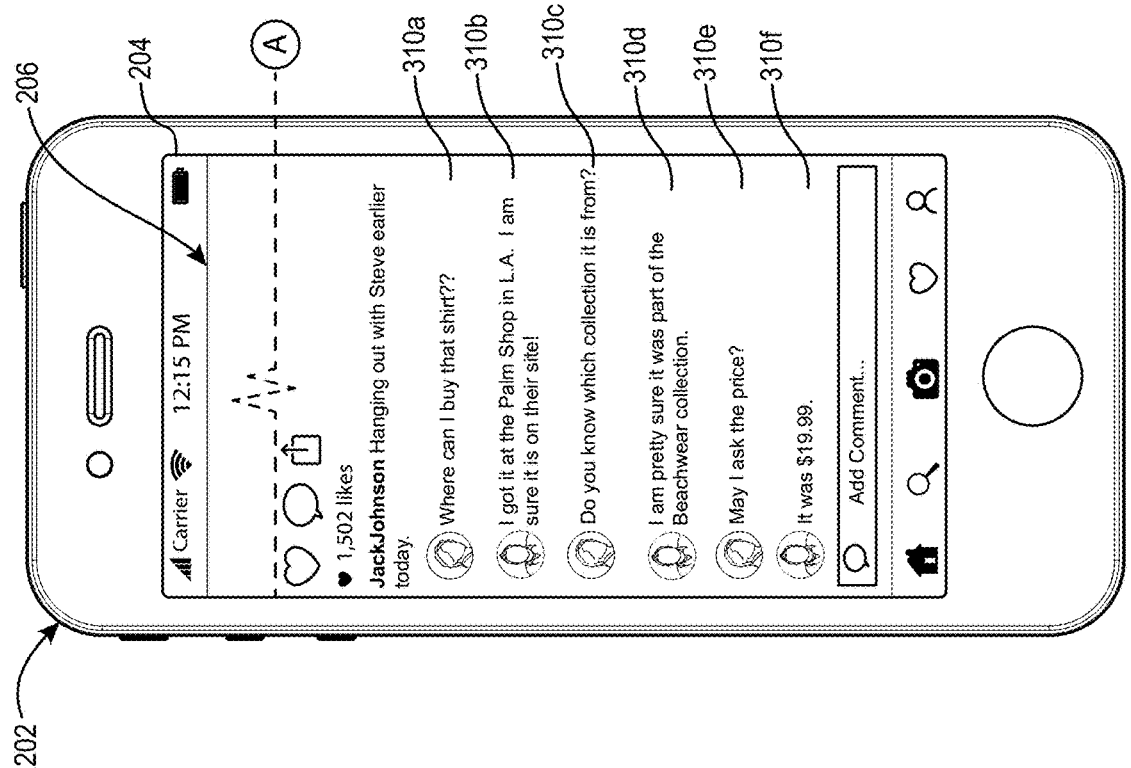
FIG. 3A-3C illustrate an example graphical user interface showing a networking post including a digital content item and associated comments in accordance with one or more embodiments.
Figure 3A:
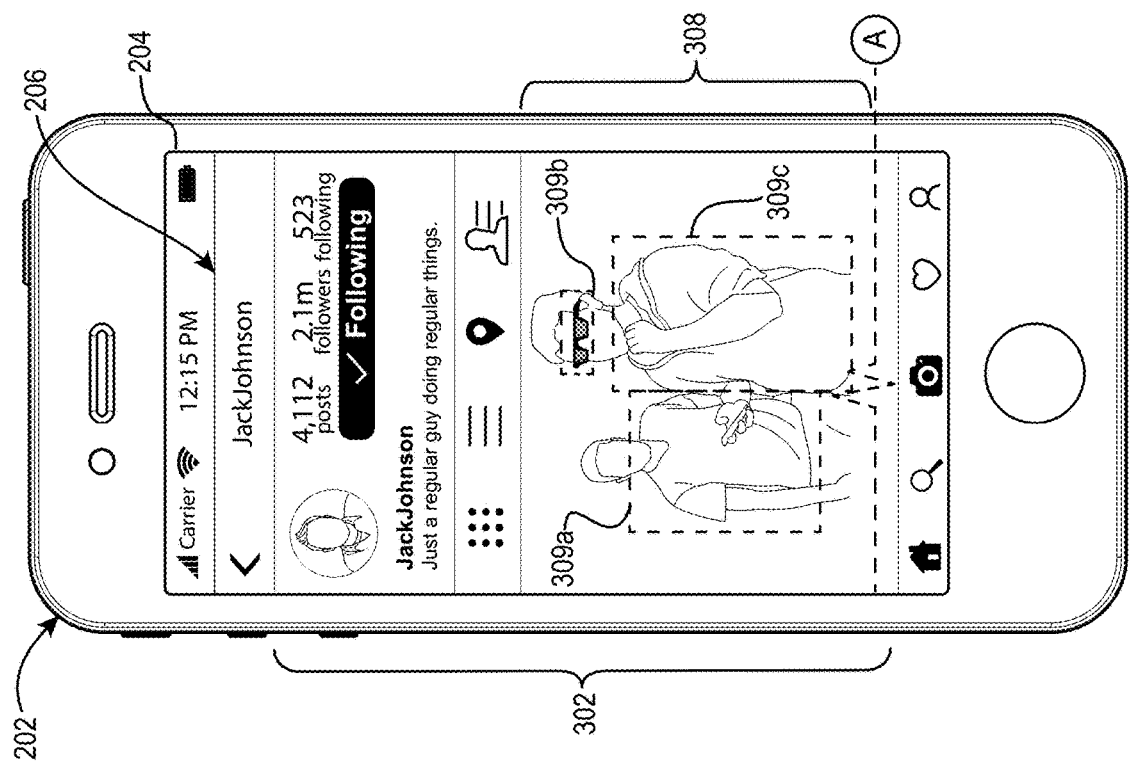
Figure 3C:
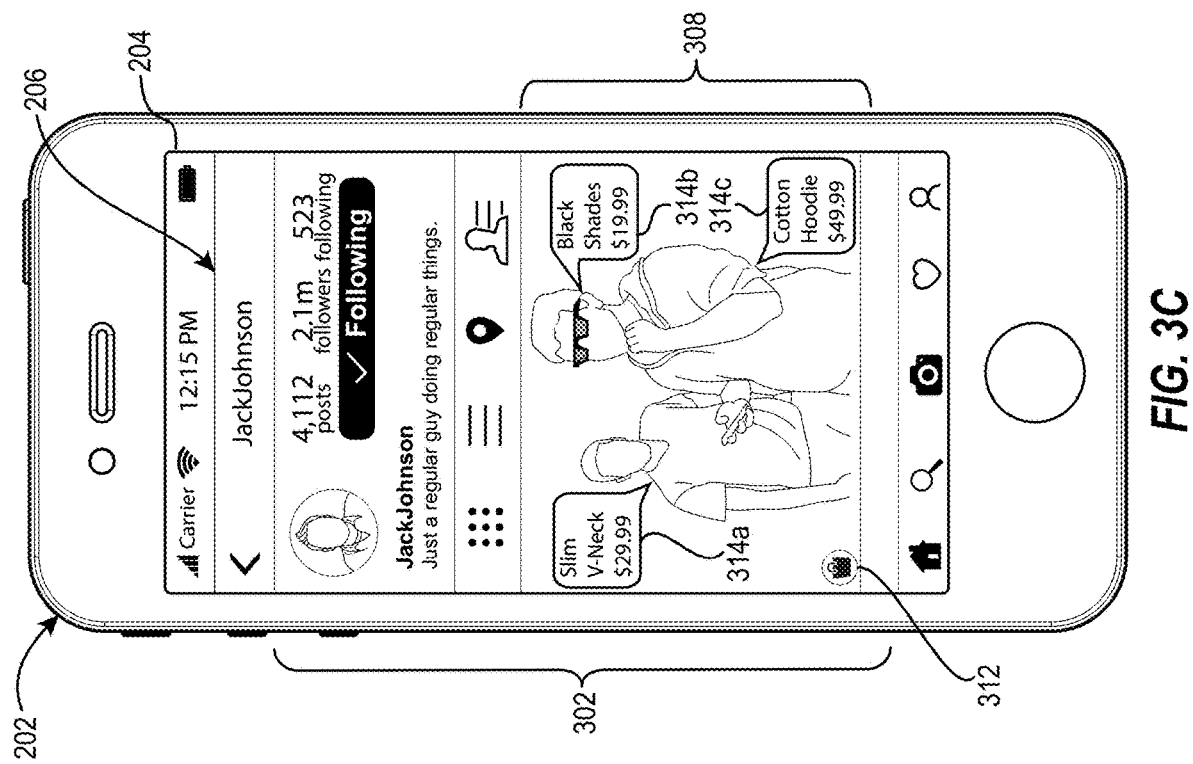

For example, in response to detecting a selection of the shoe (e.g., the third object 216c) within the system interface 206 shown in FIG. 2A, the networking system 104 provides the immersive view 218 shown in FIGS. 2B-2D within the system interface 206 of the mobile device 202. In particular, as shown in FIG. 2B, the system interface 206 includes an immersive view 218 for a shoe corresponding to the selected third object 216c. The immersive view 218 includes a product preview 220 including a visualization of the shoe. The immersive view 218 within the system interface 206 further includes a user indicator 222 ("Fire Sports") associated with a merchant for the selected shoe. In addition, the immersive view 218 includes product information 224 associated with the shoe. The immersive view 218 additionally includes a purchase button 226 that enables a user of the mobile device 202 to purchase the shoe.

As mentioned above, the immersive view 218 includes a product preview 220 including a display of the shoe. In one or more embodiments, the product preview 220 includes an image, video, and/or other digital content item that provides a visualization of the shoe. For example, in one or more embodiments, the networking system 104 provides an image including a close-up of the shoe and/or a video showing someone wearing the shoe within one or multiple digital content items provided by a merchant of the shoe. Alternatively, where a merchant (or administrative user for the username "Fire Sports") does not explicitly provide a digital content item for the product preview 220, the networking system 104 can provide a stock photo, or, alternatively, omit the product preview 220 within the immersive view 218 for the selected object. In one or more embodiments, the merchant (e.g., administrative user for the username "Fire Sports") selects an image, video, or any user-generated digital content item from one or more users (e.g., third-party users) of the networking system 104.

In addition to the product preview 220, the immersive view 218 further includes product information 224 including, for example, a description of the shoes and indicators of one or more alternative viewing options. For example, as shown in FIG. 2B, the immersive view 218 includes a product information 224 including a description of the shoes shown within the product preview 220. In addition, the product information 224 includes one or more alternative colors. In response to detecting a user selection of one of the alternative colors, the networking system 104 can provide a different digital content item than the digital content item provided via the product preview 220. For example, in one or more embodiments, the networking system 104 toggles between providing different previews of the shoes based on a user of the mobile device 202 selecting each of the different viewing options.

As further shown in FIG. 2B, the immersive view 218 includes a purchase button 226 that enables a user of the mobile device 202 to purchase the shoe (or other product(s)) shown within the immersive view 218. In particular, in response to detecting a user selection of the purchase button 226, the networking system 104 enables the user of the mobile device 202 to purchase the product shown within the immersive view 218 by providing a payment interface within the system interface 206 of the networking system 104. For example, in one or more embodiments, in response to detecting a user selection of the purchase button 226, the networking system 104 provides a purchase interface within the within the system interface 206 that enables the user to purchase the product via the system interface 206.

Alternatively, in one or more embodiments, the networking system 104 routes the mobile device 202 to a third-party website associated with a merchant, thus enabling the user of the mobile device 202 to purchase the selected product directly from the website of the merchant. For example, in response to detecting a user selection of the purchase button 226, the networking system 104 can add the product to a shopping cart on the third-party website associated with the merchant, thus enabling the user to conveniently purchase the product directly from the merchant. Where the user of the mobile device 202 has previously provided payment information (and has provided permission to the networking system 104 to use said payment information), the networking system 104 can further utilize the payment information to facilitate purchase of the product via the third-party website.

In one or more embodiments, the immersive view 218 includes additional information associated with the selected product (e.g., the selected shoe). For example, as shown in FIGS. 2C-2D, the user of the mobile device 202 can scroll through the immersive view 218 to view additional information associated with the shoe. For instance, as referenced by numeral "A," FIGS. 2B-2D show different portions of the immersive view 218 based on a scrolling action of the user of the mobile device 202 with respect to the system interface 206. Thus, FIG. 2C shows a different portion of the immersive view 218 including a collection of identified user-generated digital content items 228 including user-generated digital content items associated with the selected shoe (e.g., digital content items in which the shoe appears).

In one or more embodiments, the networking system 104 identifies the collection of user-generated digital content items 228 by analyzing any number of user-generated digital content items and identifying those user-generated digital content items in which the same shoe (e.g., same brand and/or model of the shoe) is displayed. In one or more embodiments, the networking system 104 identifies the collection of user-generated digital content items 228 by associating digital content items uploaded by various users of the networking system 104 with products from a product catalog. Additional detail with regard to identifying objects and associating the identified objects with products from a product catalog is provided below in connection with FIGS. 3A-3C.

In one or more embodiments, the collection of user-generated digital content items 228 includes a row of digital content items (e.g., previews or thumbnails of the digital content items) that enables a user of the mobile device 202 to scroll through the collection of user-generated digital content items 228. For example, a user can perform a swipe or other touch gesture with respect to row of user-generated digital content items. In response, the networking system application 110 can cause the row of user-generated digital content items to scroll through any number of user-generated digital content in which the shoe appear. In this way, the user of the mobile device 202 can view realistic representations of the shoe within user-generated digital content items posted to the networking system 104 (e.g., by various end-users).

In one or more embodiments, the networking system 104 selectively provides user-generated digital content items within the collection of user-generated digital content items 228 based on a coefficient between the user of the mobile device 202 (e.g., a user associated with a respective account of the networking system 104) and any number of identified digital content items associated with the shoe. For example, in one or more embodiments, the networking system 104 ranks the identified user-generated digital content items and presents the user-generated digital content items within the collection based on the respective rankings. Additional detail in connection with determining the coefficient between the user and user-generated digital content items as well as presenting the collection of user-generated digital content items 228 is provided below in connection with FIGS. 4A-4D.

The immersive view can further include selectable options that modify one or more portions of the immersive view 218. For example, as shown in FIG. 2C-2D, the immersive view 218 includes a "complete the look" option 230 and a "related" option 232. As shown in FIG. 2C, where the "complete the look" option 230 is selected, the immersive view 218 includes tagged products 234 including one or more products shown within the user-generated digital content item 210 (e.g., shown in FIG. 2A). For example, as shown in FIG. 2C, the tagged products 234 represented by images (e.g., thumbnail previews) of the shirt (corresponding to the first object 216a) and the bicycle (corresponding to the second object 216b). In one or more embodiments, the images representing the tagged products 234 include stock photos or other images provided by an administrative user of a merchant account. Alternatively, in one or more embodiments, the images representing the tagged products 234 include identified user-generated digital content items associated with or otherwise including the tagged objects displayed therein.

While FIG. 2C shows tagged products 234 based on a selection of the "complete the look option" 230, FIG. 2D shows a collection of similar products 240 based on a selection of the "related" option 232. In particular, in response to a user of the mobile device 202 selecting the "related" option 232, the networking system application provides a presentation of the similar products 240 including one or more similar shoes to the selected object 216c from the user-generated digital content item 210. In one or more embodiments, the collection of similar products 240 includes a presentation of shoes from the same merchant or brand. Alternatively, in one or more embodiments, the networking system 104 provides similar or comparable products (e.g., different types of shoes) from different merchants or brands. For example, the collection of similar products 240 can include a first shoe having the same brand as the selected shoe from the user-generated digital content item 210 and a second shoe having a different brand from the shoe shown in the user-generated digital content item 210.

As further shown in FIGS. 2C-2D, the immersive view 218 includes collections icons 236 including selectable icons corresponding to different collections of products. For example, as shown in FIGS. 2C-2D, the immersive view 218 can include collections corresponding to each of the products identified within the user-generated digital content item 210. Alternative, in one or more embodiments, the collections icons 236 includes one or more different products from those shown within the user-generated digital content item 210. For example, the networking system 104 can determine that, based on a user's interests, or based on the selected product corresponding to the immersive view 218, the user may have an interest in one or more different products (e.g., hats, exercise clothes, etc.). Thus, in one or more embodiments, the networking system 104 provides collection icons 236 corresponding to products in which the user of the mobile device 202 may have an interest.

In one or more embodiments, the social networking application 110 enables a user to select one of the collection icons in order to view products within a selected collection. In particular, in response to detecting a selection of a collection icon, the networking system 104 can provide a listing or display of different products corresponding to the selected collection icon. The listing or display of products may correspond to the same merchant or may alternatively include different products from different merchants. The user can further select one of the displayed products and view additional information about the product. For example, in one or more embodiments, the networking system 104 provides another immersive view including information about the selected product.

In one or more embodiments, the networking system application 110 enables a user of the mobile device 202 to scroll through each of the different menus/collections. For example, as shown in FIGS. 2C-2D, the collection of identified user-generated digital content item 228 includes a side-scrolling display of user-generated digital content items that a user can view by swiping from right to left. Similarly, the tagged items 234 and similar products 240 can include a side-scrolling display that enables a user to swipe horizontally to view additional icons. Moreover, the collections icons 236 can similarly include a side-scrolling display that enables the user to swipe horizontally and view additional collections.

Thus, as shown in FIG. 2A-2D, the networking system 104 enables a user of the mobile device 202 to interact directly with a user-generated digital content item 210 provided within a system interface 206 of a networking system application 110 and select a product shown within the user-generated digital content item 210. In response to detecting a user-selection of the product, the networking system 104 provides the immersive view 218 including information about the product. In addition, the networking system 104 further enables the user to purchase the product via interactions with the immersive view 218 provided within the system interface 206 of the networking system 104. In addition, it will be understood that the networking system 104 can provide any number of immersive views for any number of products detected within a displayed digital content item.

Additional detail will now be given with respect to identifying products from a product catalog shown within digital content items and associating the digital content items (e.g., user-generated digital content items) with the identified products. In particular, additional detail with respect to identifying products from a product catalog will be described in reference to a system interface 206 shown in FIGS. 3A-3C.

For example, as shown in FIGS. 3A-3C, the networking system 104 provides a system interface 206 displayed via a touch screen display 204 of a mobile device 202. In particular, as shown in FIG. 3A, the system interface 206 includes a profile display 302 associated with a user of a social networking account having the username "JackJohnson." The system interface 206 further includes a profile header at the top of the profile display 302 including a portion of profile information associated with the user ("JackJohnson") of the social networking account. In addition, the system interface 206 includes a user-generated digital content item 308 displayed within the profile display 302. The profile display 302 can include any number of user-generated digital content items therein. In addition, as an alternative to the example shown in FIG. 3A, the system interface 206 can include thumbnails or reduced size previews of the user-generated digital content items displayed within a grid view of the profile display 302.

The networking system 104 can detect objects within user-generated digital content items provided to the networking system 104 via users of the networking system 104. In particular, as shown in FIG. 3B, the networking system 104 identifies a first object 309a (a shirt), a second object 309b (sunglasses), and a third object 309c (a sweatshirt). While one or more embodiments described herein involve selecting articles of clothing shown within digital content items, the networking system 104 can similarly identify other types of products shown therein. For example, the networking system 104 can detect cars, electronic devices (e.g., mobile phones), bicycles, furniture, and other types of objects.

In one or more embodiments, the networking system 104 detects the objects using various object detection methods. For example, in one or more embodiments, the networking system 104 identifies a discrete portion of a user-generated digital content item and determines that an object exists within the discrete portion. In addition, the networking system 104 can determine the type of object within the discrete portion. For example, in one or more embodiments, the networking system 104 detects an object by analyzing content (e.g., pixels) of the digital content item and determining that a bicycle, a shirt, a sweatshirt, glasses, a watch, or any number of objects exists at discrete locations within the user-generated digital content item.

As an alternative to analyzing visual content to detect objects shown therein, the networking system 104 can additionally receive a user-identification of an object within the digital content item. For example, in one or more embodiments, an end-user, merchant, influencer, or other entity of the networking system 104 taps or otherwise selects the digital content item at a specific location to tag an object therein. In addition, in one or more embodiments, the user can identify a type of object and/or brand of the object in conjunction with tagging the location of the object within the digital content item. In one or more embodiments, the networking system 104 additionally analyzes the content of the digital content item to confirm a user-selection and identification of an object therein.

In addition to generally detecting the objects within the user-generated digital content item 308, the networking system 104 further associates one or more of the objects with products from a product catalog. As used herein, a "product catalog" refers to a collection of products and associated product information maintained or otherwise accessible to the networking system 104. For example, a product catalog can include various goods and services as well as associated brands, merchants, and purchase information (e.g., price, size, colors, shipping data, availability, etc.) In one or more embodiments, the product catalog includes products from any number of merchants and/or brands. Alternatively, in one or more embodiments, the product catalog includes products from a single merchant and/or associated brand. The networking system 104 can construct the product catalog from information received from various merchants (e.g., merchants requesting that the networking system 104 add products to the product catalog). In addition, or as an alternative, in one or more embodiments, the networking system 104 constructs the product catalog from information collected by the networking system 104 (e.g., based on user-tags, comments, or analysis of posts by users of the networking system 104).

Thus, as mentioned above, the networking system 104 associates the user-generated digital content item 308 with any number of products from the product catalog depending on a number of the detected objects therein (e.g., a number of detected objects determined to have a corresponding product within the product catalog). In particular, in one or more embodiments, the networking system 104 associates the user-generated digital content item 308 with the corresponding product by tagging the user-generated digital content item with the product from the product catalog. In one or more embodiments, the networking system 104 associates a digital content item with products across different merchants. For example, in the example shown in FIG. 3B, the networking system 104 can associate the user-generated digital content item 308 with products from three different merchants where the shirt (e.g., first object 309a), the glasses (e.g., the second object 309b), and the sweatshirt (e.g., the third object 309c) have different brands associated with different merchants.

In associating digital content items with products from the product catalog, the networking system 104 determines a confidence score associated with a likelihood that the detected object is one and the same or otherwise corresponds. In particular, with respect to each detected object, the networking system 104 identifies a corresponding product from the product catalog and determines a confidence score associated with a likelihood (e.g., a probability) that the detected object and the corresponding product are one and the same. Based on the confidence score, the networking system 104 associates the object (and associated user-generated digital content item) with the product from the product catalog. The networking system 104 can similarly determine a confidence score for each detected object and associate the associated digital content item with any number of products based on the determined confidence scores.

The networking system 104 can determine the confidence score based on a variety of factors. For example, in one or more embodiments, the networking system 104 determines the confidence score based on an analysis of visual characteristics of the user-generated digital content item. In one or more embodiments, the networking system 104 analyzes a portion of the user-generated digital content item including the detected object to determine the confidence score for the detected object. As an example, in one or more embodiments, the networking system 104 compares visual attributes of the user-generated digital content item to a set of training images containing known instances of various products to determine a confidence score associated with whether a detected object is one and the same as the product shown within the set of training images. Thus, in one or more embodiments, the networking system 104 accesses a database of training images known to include products that correspond to products from the product catalog to utilize in determining whether a user-generated digital content item includes instances of products from the product catalog.

Thus, in connection with the user-generated digital content item 308 shown in FIG. 3A, the networking system 104 can compare the visual attributes of different portions of the user-generated digital content item 308 with images known to contain one or more similar products to determine a likelihood that the detected shirt, glasses, and sweatshirt correspond to respective products from the product catalog. In addition, or as an alternative, in one or more embodiments, the networking system 104 identifies and analyzes contextual cues (e.g., patterns, hashtags, etc.) found within a digital content item and/or post associated with the digital content item. In one or more embodiments, the networking system 104 analyzes user-generated digital content items and associated networking posts using a similar process described in "Systems and Method for Image Classification by Correlating Contextual Cues with Images," as described in Patent Publication No. 2015/0036919, which is incorporated herein by reference in its entirety.

As another example of examining visual characteristics of a product, in one or more embodiments, with or without training images for respective products, the networking system 104 can analyze the user-generated digital content item to identify instances of a brand name and/or logo corresponding to a limited number of products from the product catalog. For example, where a shirt includes a display of a logo on the front (and which is visible within the display of the user-generated digital content item), the networking system 104 can boost the confidence score indicating a high likelihood the shirt corresponds to a particular brand associated with the logo. In addition, the networking system 104 can possibly identify a specific shirt from the product catalog known to have the logo displayed on the front of the shirt.

In addition to examining visual characteristics of the user-generated digital content item, the networking system 104 can further determine the confidence score based on tracked interactions between a creator or sharer of the user-generated digital content item (or simply "content creator") and one or more brands or merchants associated with various products. For example, the networking system 104 can identify user-ratings of a content creator with respect to a brand or merchant (e.g., whether a content creator has "liked" a specific brand") In addition, the networking system 104 can identify messages between the content creator and a networking account associated of the merchant or brand. Further, the networking system 104 can identify whether the content creator follows a particular brand, related brands, merchant, related merchants (e.g., merchants who sell similar products), and/or influencers of the networking system 104 associated with a respective brand or merchant. Based on these interactions of a content creator with respective digital content items, merchants, brands, influencers, etc., the networking system 104 can determine that a content creator is more or less likely to post a user-generated digital content item including a particular product.

In one or more embodiments, rather than only considering the content creator, the networking system 104 can similarly consider interactions between tagged users within a user-generated digital content item and different brands, merchants, influencers, etc. in determining the confidence score. For example, as shown in FIG. 3A, the user-generated digital content item 308 includes two people wearing different clothing. While one of the people may refer to the content creator, the other person (or both people) within the user-generated digital content item 308 would not also refer to the content creator. As such, where one or both of the people shown within the user-generated digital content item 308 refer to different users of the networking system 104, the networking system 104 may additionally consider interactions between tagged individuals (e.g., having corresponding networking system accounts) shown within the user-generated digital content item 308 to determine the confidence score associated with a likelihood of whether a particular product corresponds to a detected object shown therein. In particular, where a tagged user follows, likes, or otherwise has a history of interactions with a particular brand, the networking system 104 can determine that the tagged user is more likely to wear clothing for the particular brand (e.g., when shown within user-generated digital content items).

The networking system 104 can additionally consider tracked interactions between users associated with a content creator and one or more brands and/or merchants in determining the confidence score. For example, the networking system 104 can consider similar types of interactions as described above between the content creator and various merchants, brands, and/or influencers to determine the confidence score. In particular, using a similar rationale as discussed above, the networking system 104 can determine that because a content creator has friends who have had numerous interactions with a particular brand or merchant, the content creator is more likely to have purchased an associated product and subsequently share an image including the associated product. Alternatively, even if the content creator does not purchase the product, the networking system 104 may determine that images posted by a content creator (and often include photos of friends or other users of the networking system 104) are more likely to include instances of products associated with the particular brand or merchant. Thus, in one or more embodiments, the networking system 104 further boosts a confidence score for a particular product based on common connections (e.g., friends, followers) between the content creator and a brand or merchant.

In addition, in one or more embodiments, the networking system 104 further considers self-directed messages (e.g., saved posts) by a content creator (or associated user) in determining the confidence score. For example, where a user views an advertisement, marketing post, or a user-generated digital content item including an instance of a product and saves the post or sends a message including the post to him or herself, the networking system 104 can determine that the user is more likely to purchase the product and subsequently post a user-generated digital content item that includes the product shown therein. As such, the networking system 104 can boost a confidence score for a product where a user (e.g., content creator, tagged user) has saved a post from a merchant or saved a post including an instance of a product from the product catalog.

Along similar lines, in one or more embodiments, the networking system 104 can determine the confidence score further based on interactions with an immersive view for a product. For example, the networking system 104 can detect that a user (e.g., content creator, tagged user) has entered an immersive view for a product. The networking system 104 can further identify how long the user dwelled within the immersive view for the product (or for a similar product). The networking system 104 can further identify whether the user scrolled through an immersive view and track interactions of the user with one or more selectable options within the immersive view. Based on these interactions, the networking system 104 can increase or decrease the confidence score associated with the product from the immersive view or one or more related products.

In one or more embodiments, the networking system 104 can further increase or decrease the confidence score based on one or more detected screenshots of a post and/or digital content item. For example, where a content creator has previously taken a screenshot of a post by a merchant or other user of the networking system 104 including a product shown therein, the networking system 104 can boost a confidence score associated with the product.

In addition, the networking system 104 can further consider tracked purchases by the content creator and/or tagged individuals within the user-generated digital content item in determining the confidence score. For example, the networking system 104 can track one or more purchases made by a user of the networking system 104 using a shopping interface provided by the networking system 104. Alternatively, in one or more embodiments, the networking system 104 tracks one or more purchases by a user of the networking system 104 via third-party websites. For example, the networking system 104 can receive information about purchases made by a user based on information provided to the networking system 104 by respective merchants. Alternatively, in one or more embodiments, the networking system 104 can detect purchase information based on tracking pixels or other purchase detection methods.

In one or more embodiments, the networking system 104 determines the confidence score based on tagged products within other user-generated digital content items shared by the content creator (or tagged individuals within the user-generated digital content items). For example, where a user wears the same shirt in multiple photos, the networking system 104 can utilize other instances of the product from other user-generated digital content items to boost the confidence score associated with the same or similar products shown within other user-generated digital content items from the same user.

In one or more embodiments, the networking system 104 further considers comments and reactions of users of the networking system 104 in connection with the shared user-generated digital content item to determine a confidence score. For example, as shown in FIG. 3B, the system interface 206 includes comments 310a-f by friends and/or other associated users of the networking system 104 to the user having the username "JackJohnson" and who shared the user-generated digital content item 308. In particular, the comments 310a-f illustrate a conversation between the content creator and a friend on the networking system 104. In the conversation, the content creator and the friend collectively refer to the shirt (e.g., the first object 309a), a store location (e.g., the Palm Shop in L.A.), a collection (e.g., the Beachware collection), and a price.

In one or more embodiments, the networking system 104 utilizes natural language processing, or other text-parsing techniques to determine that the comments 310a-f reference a shirt shown within the user-generated digital content item 308, a merchant or store associated with the shirt, a brand associated with the shirt, and a price. In one or more embodiments, the networking system 104 extracts this information associated with a purchase of the shirt shown within the user-generated digital content item 308 and identifies a product including a similar brand, merchant, and/or price and further determines a confidence score between the user-generated digital content item 308 and a particular product based on the information obtained from the comments 310a-f.

By way of example and not limitation, the networking system 104 can further consider other factors in determining the confidence score. For example, the networking system 104 can consider a price of a product and whether a user (e.g., content creator or individual wearing the product) has a purchase history that supports purchasing products having a similar price. As another example, the networking system 104 may consider affinity of a user with a particular style, color, or other visual characteristic (e.g., whether a user has a preference for a particular color). As another example, the networking system 104 may consider identical or similar images posted by one or more other users of the networking system 104 in which a product has been previously tagged.

In one or more embodiments, the networking system 104 determines the confidence score based on any number or combination of factors. For example, in one or more embodiments, the networking system 104 considers multiple of the above factors and increases or decreases the confidence score based on each of the factors. To illustrate, the networking system 104 may boost a confidence score based on a determination that a user has previously liked one or more posts shared to the networking system 104 by a merchant. Alternatively, the networking system 104 may decrease the confidence score based on a determination that the user has no shopping history for products from the merchant. The networking system 104 may additionally consider any number of factors to determine a confidence score.

In one or more embodiments, the networking system 104 additionally associates or disassociates a product from a user-generated digital content item based on received user-input associated with a detected object. For example, an administrative user, end-user, or other entity can tag a product within a user-generated digital content item. In one or more embodiments, a user (e.g., content creator) confirms a tag by a merchant or other user. Alternatively, in one or more embodiments, a merchant, user (e.g., content creator or tagged individual) can override a tag made erroneously by another user. In one or more embodiments, the networking system 104 can confirm a user-tag based on any number of the factors described above. For example, where a user has tagged a product within a user-generated digital content item, the networking system 104 can confirm the user-tag or otherwise increase (or decrease) the confidence score based on a shopping history of the content creator and a history of interactions between the content creator and the merchant associated with the product.

As an example, in one or more embodiments, a user who creates a post including a user-generated digital content item can tag one or more products shown within the user-generated digital content item at the time of creation of the post. For instance, in one or more embodiments, the networking system 104 provides a post creation interface and includes an option to tag one or more products shown within the post. In one or more embodiments, the user manually selects one or more objects and indicates a product associated with the object(s). In one or more embodiments, the networking system 104 enables a user to search for one or more products and provides (e.g., based on one or more factors described herein) a recommended tag based on a prediction or identification of a corresponding product by the networking system 104.

As mentioned above, the networking system 104 can determine the confidence score based on a combination of multiple factors. In addition, in one or more embodiments, the networking system 104 considers one or more factors more heavily than other factors. For example, in one or more embodiments, the networking system 104 weights certain factors more indicative of whether a user has purchased a product than other factors less indicative of whether the user has purchased the product. For instance, the networking system 104 may consider a tracked purchase of a product by a content creator more heavily than a determination that a friend of the content creator follows a merchant associated with the product. Nonetheless, while the networking system 104 considers these two factors differently, the networking system 104 can consider both in calculating the confidence score.

In one or more embodiments, the networking system 104 associates the digital content item and product based on whether the confidence score exceeds a threshold. For example, the networking system 104 may tag the product with the detected object and user-generated digital content item based on a threshold probability (e.g., a 90% likelihood) that the user-generated digital content item includes the corresponding product shown therein.

In one or more embodiments, the networking system 104 enables an administrative user associated with the merchant and/or brand of the product to override a particular association between a detected object and a product. For example, where the networking system 104 incorrectly associates a product with a user-generated digital content item, the merchant, user, or other entity can select an override option or send a message including instructions to the networking system 104 that the association is incorrect. In response, the networking system 104 can disassociate the product from the user-generated digital content item and attempt to identify a new product and associated confidence score.

Upon associating the user-generated digital content item with products from the product catalog, the networking system 104 can further reveal or otherwise provide an indication of the identified products within a display or presentation of the user-generated digital content item. For example, as shown in FIG. 3C, the system interface 206 includes a product reveal icon 312. Upon detecting a user-selection of the product reveal icon 312, the networking system application 110 provides product indicators 314*a-c* that indicate products associated with detected objects within the user-generated digital content item 308. In particular, as shown in FIG. 3C, the product indicators 314*a-c* include a first product indicator 314*a* including product information associated with the first detected object 309*a* (the shirt), a second product indicator 314*b* including product information associated with the second detected object 309*b* (the glasses), and a third product indicator 314*c* including product information associated with the third detected object 309*c* (the sweatshirt).

In one or more embodiments, the networking system 104 provides an immersive view for a selected product based on a selection of a corresponding product indicator. For example, in response to detecting a user-selection of the first product indicator 314*a*, the networking system 104 can provide an immersive view including similar features and characteristics described above in connection with the immersive view 218 shown in FIGS. 2B-2D. In addition, the networking system 104 can provide an immersive view to any user of the networking system 104 having access to the user-generated digital content item 308 for each of the products corresponding to the product indicators 314*a-c*.

Upon associating the products shown within the user-generated digital content item 308, the networking system 104 can enable any user of the networking system 104 having access to the user-generated digital content item 308 to interact with the user-generated digital content item 308 to view an immersive view for a selected product. In addition, the networking system 104 further enables users to interact with the user-generated digital content item 308 to purchase the associated product via the system interface 206 of the networking system 104 or, alternatively, via a third-party website associated with a merchant of the selected product. For example, a friend of the user who posted the user-generated digital content item 308 can select the sunglasses to view an immersive view for the sunglasses as well as purchase the sunglasses via the networking system 104.

In addition, upon associating the products shown within the user-generated digital content item 308, the networking system 104 can further provide the user-generated digital content item 308 within immersive views provided with respect to products shown within other digital content items on the networking system 104. For example, where a user of the networking system 104 interacts with another user-generated digital content item including similar or identical sunglasses as those included within the user-generated digital content item 308, the networking system 104 can provide an immersive view including a preview of the user-generated digital content item 308 within the collection of identified user-generated digital content items (e.g., "Seen on Instagram") provided within the immersive view for the selected product.

Thus, the networking system 104 can provide the user-generated digital content item 308 within immersive views for selected products corresponding to those products identified within the user-generated digital content item 308. In addition, in one or more embodiments, the networking system 104 selectively identifies and provides user-generated digital content items to a corresponding user (e.g., within an immersive view for a corresponding product) based on characteristics of the corresponding user, identified user-generated digital content items including the product therein, and other factors.

In particular, the networking system 104 can determine coefficients between an end-user (e.g., a user of the mobile device 202) and a plurality of user-generated digital content items and present one or more of the user-generated digital content items within an immersive view for a product in accordance with the determined coefficients. For example, as described by way of example in connection with FIGS. 4A-4D, the networking system 104 can provide an immersive view unique to a particular user of the networking system 104 including user-generated digital content items that have been selectively identified for a particular user.

Figure 4B:
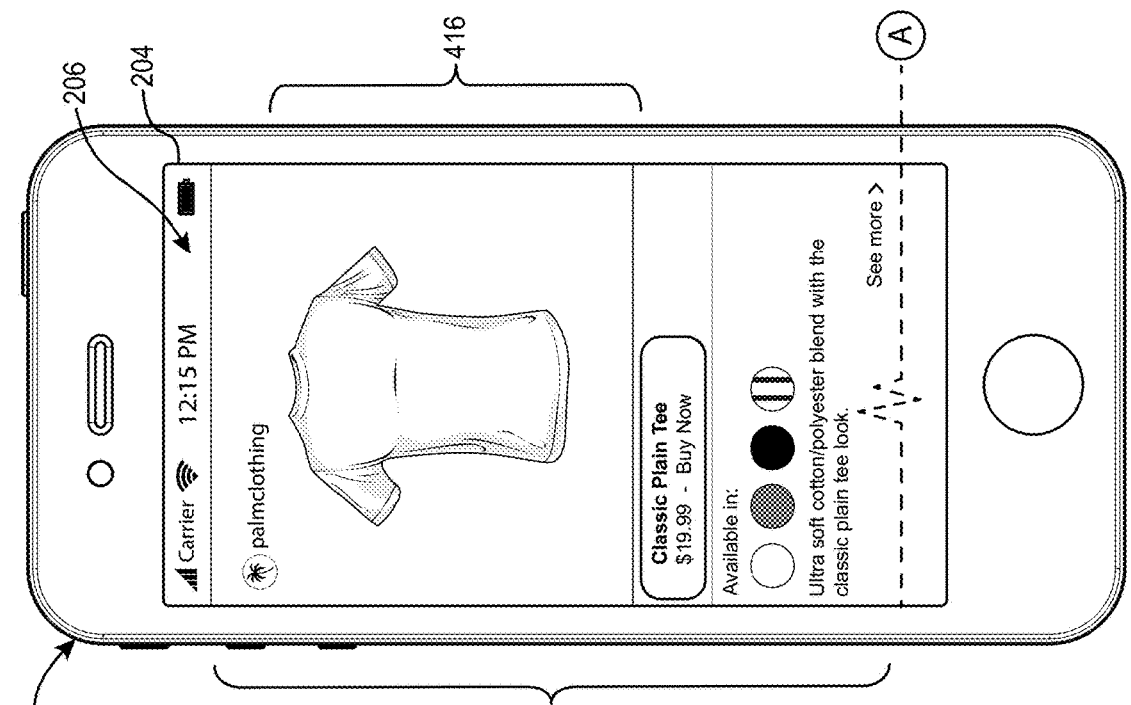
FIGS. 4B-4D illustrate an example user interface showing example immersive views for a selected product in accordance with one or more embodiments.
Figure 4A:
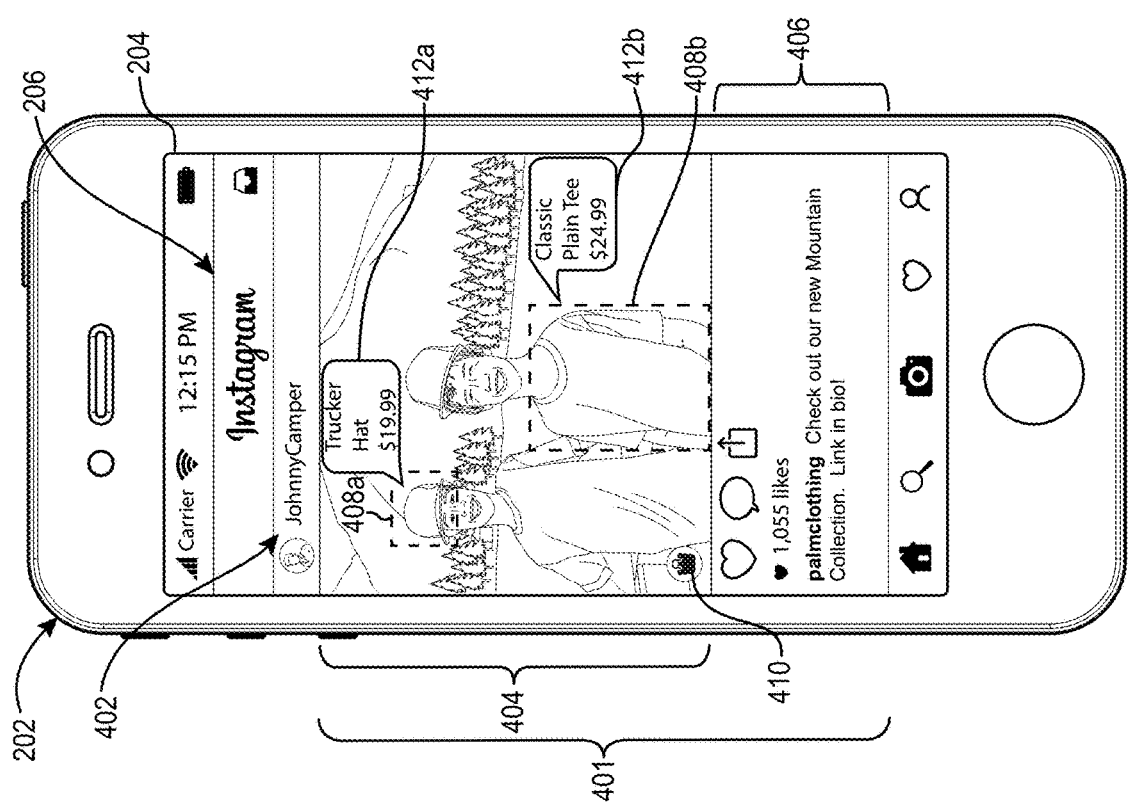
FIG. 4A illustrates an example user interface for selecting an identified product shown within a digital content item in accordance with one or more embodiments.
Figure 4D:
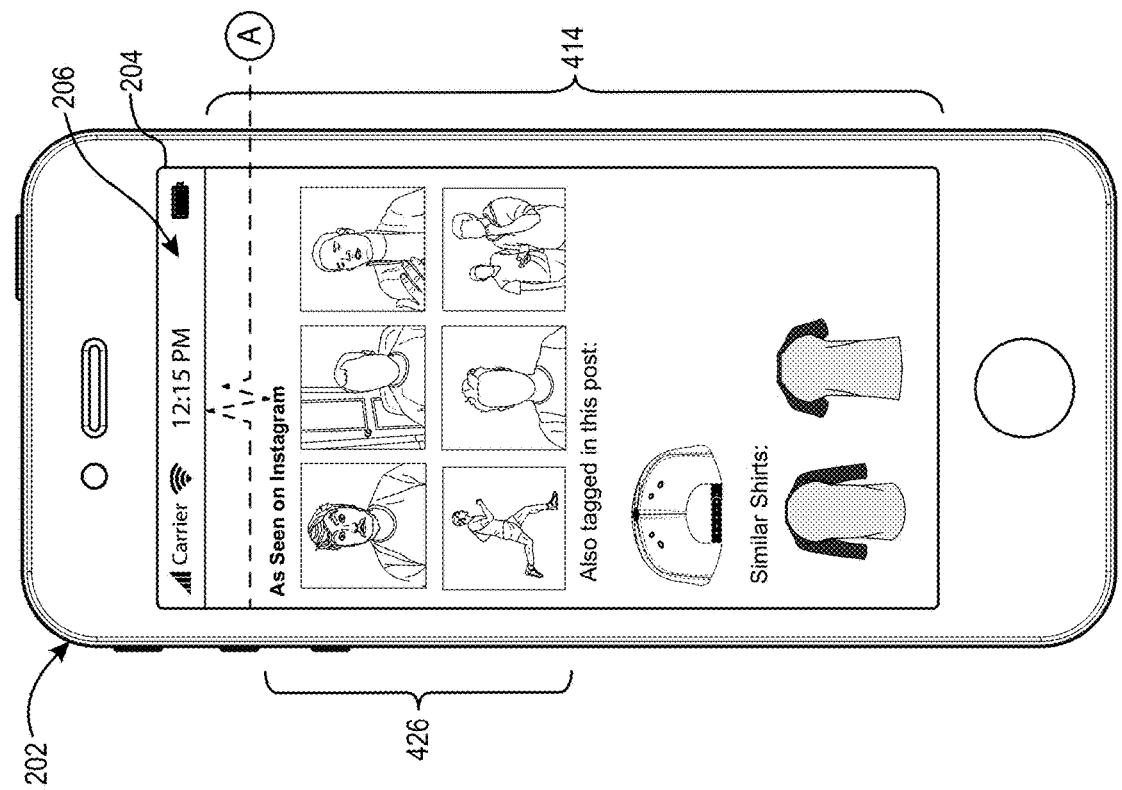

For example, FIGS. 4A-4D illustrate a mobile device 202 including a touch screen display 204 that provides a system interface 206 of the networking system 104. As shown in FIGS. 4A-4D, the system interface 206 includes similar features and characteristics as discussed above in connection with FIGS. 2A-3C. For example, as shown in FIG. 4A, the system interface 206 includes a profile display 401 associated with a user of the networking system 104 having the username "JohnnyCamp." In particular, as shown in FIG. 4A, the profile display 401 includes a username indicator 402 ("JohnnyCamp") and a social networking post from the user of the associated profile display 401 including a user-generated digital content item 404 in addition to post information (e.g., user-ratings, shares, comments) associated with the user-generated digital content item 404. In one or more embodiments, the social networking post including multiple user-generated digital content items displayed within the profile display 401. For example, in one or more embodiments, networking system application 110 enables a user of the mobile device 202 to view multiple digital content items shared via a single social networking post.

As discussed above in connection with FIGS. 3A-3D, the networking system 104 can detect objects and associate detected objects with respective products from a product catalog. Thus, in one or more embodiments, the user-generated digital content item 404 includes one or more identified products previously identified and associated with respective products (e.g., in accordance with a determined confidence score). Accordingly, for the sake of explanation, FIG. 4A illustrates a user-generated digital content item 404 within which the networking system 104 has detected multiple objects and associated corresponding products with the user-generated digital content item 404. For example, as shown in FIG. 4A, the user-generated digital content item 404 includes a first object 408a (a hat) and a second object 408b (a shirt).

The system interface 206 further includes a product reveal icon 410 that enables a user to view which objects within the user-generated digital content item 404 have been identified as having corresponding products within the product catalog as well as view additional information about the products. For example, in response to detecting a user-selection of the product reveal icon 410, the networking system application 110 provides product indicators 412a-b for the identified products therein. In particular, as shown in FIG. 4A, the system interface 206 includes a first product indicator 412a including information about the hat (e.g., brand name, price) and a second product indicator 412b including similar types of information about the shirt.

In one or more embodiments, the networking system 104 enables a user of the mobile device 202 to select an identified product or product indicator 412a-b to view an immersive view for a selected product. For example, in response to detecting a user-selection of the second product indicator 412b, the networking system 104 provides an immersive view 414 for the shirt including similar features and characteristics as one or more immersive views described above. For example, as shown in FIG. 4B, the immersive view 414 includes a product preview 416 including an image, video, or other visualization of the shirt from the user-generated digital content item 404. Similar to one or more examples of immersive views described herein, the immersive view 414 shown in FIG. 4B further includes information associated with the selected product corresponding to the immersive view 414.

Figure 4C:
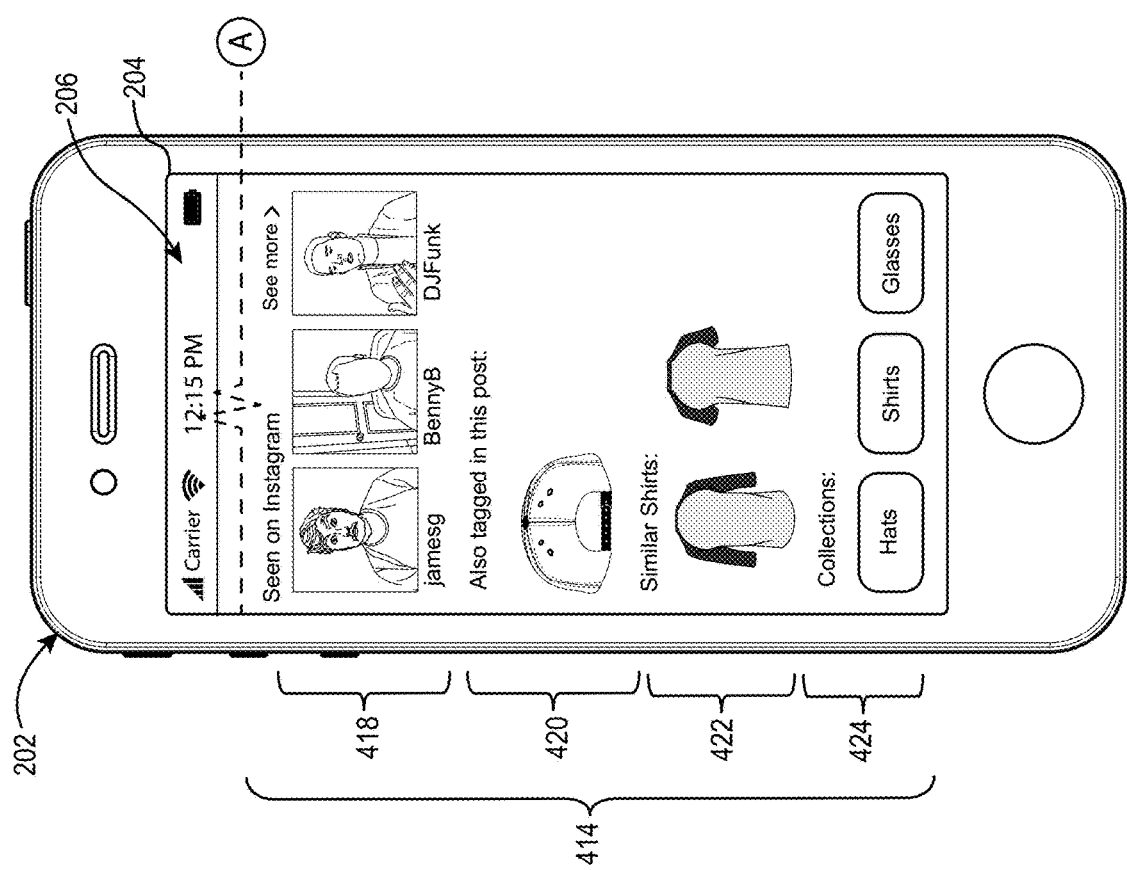
Figure 5B:
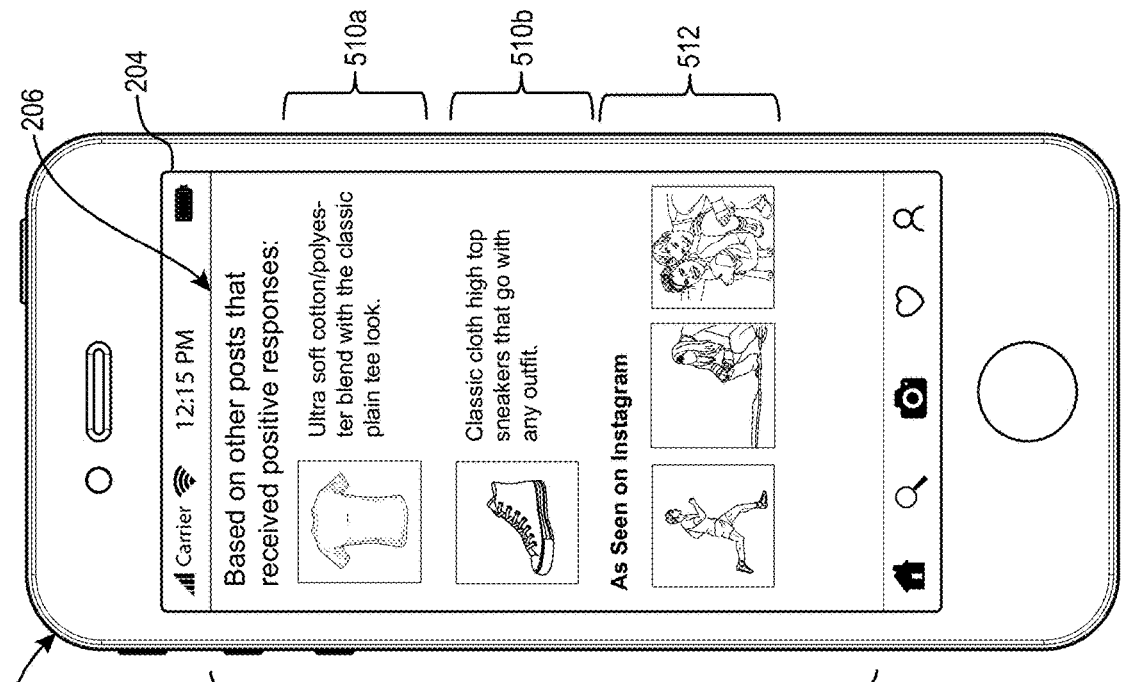
FIGS. 5A-5B illustrate example graphical user interfaces for generating and providing a creation insight including an identification of one or more products in accordance with one or more embodiments.
Figure 5A:
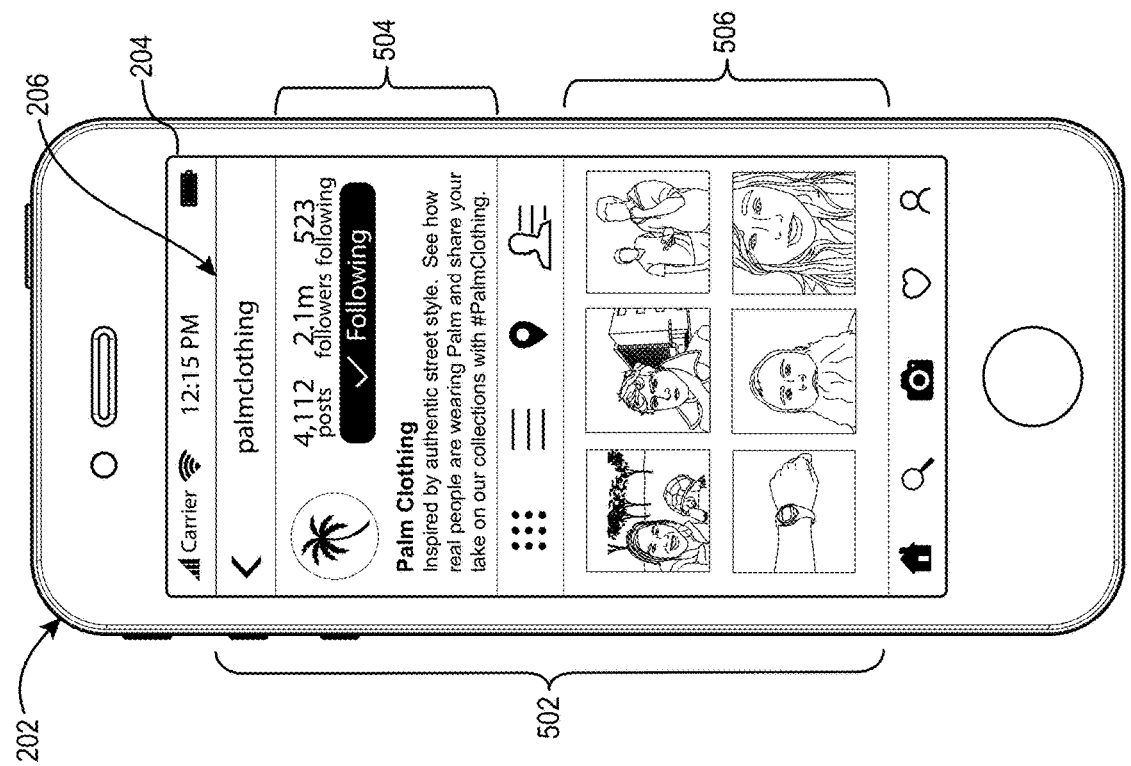

In addition, the immersive view 414 includes further information associated with the selected product. For example, in response to a scrolling input (e.g., up input, swipe up), the networking system application 110 causes the mobile device 202 to display a different portion of the immersive view 414. In particular, FIG. 4C illustrates additional information included within the immersive view 414 including, for example, a collection of user-generated digital content items 418 selected for a user associated with the user-profile shown within FIG. 4A. As shown in FIG. 4C, the collection of user-generated digital content items 418 includes indicators of usernames ("jamesg," "BennyB," "DJFunk") of various users of the networking system 104 who posted or otherwise shared the user-generated digital content items with the networking system 104. Thus, a user of the mobile device 202 can see, within the immersive view, a source (e.g., username) of the respective user-generated digital content items shown within the collection of identified user-generated digital content items 418. In one or more embodiments, the networking system 104 enables a user to select the usernames to view respective profile displays associated with the indicated usernames.

The immersive view 414 further includes additional information about the identified product. For example, as shown in FIG. 4C, the immersive view 414 includes tagged products 420 including one or more identified products that appear within the user-generated digital content item 404. The immersive view 414 further includes a collection of similar products 422 to the selected product (e.g., similar shirts from the same or different brand). The immersive view 414 further includes collections icons 424 including selectable icons corresponding to different collections of products (e.g., from the same or different brand).

Additional detail will now be given with respect to identifying and organizing the user-generated digital content items provided within the immersive view 414. For example, the networking system 104 can selectively identify one or more user-generated digital content items to include within the collection of user-generated digital content items 418 based on various factors associated with the user of the mobile device 202. In particular, in one or more embodiments, the networking system 104 determines a coefficient between the user of the mobile device 202 and user-generated digital content items associated with the identified product (e.g., user-generated digital content items in which the product has been previously identified by the networking system 104).

As used herein, a "coefficient" refers to a value (e.g., numeric value) or metric associated with a predicted preference for a corresponding user. For example, a high coefficient between a user and a corresponding digital content item indicates that the user will more likely notice, interact with, or otherwise engage the digital content item when presented via a graphical user interface than a digital content item associated with a lower coefficient. In contrast, a low coefficient between the user and a corresponding digital content item indicates that the user will not likely notice, interact with, or otherwise engage the digital content item when presented via a graphical user interface. Thus, in one or more embodiments, the networking system determines a coefficient corresponding to a likelihood or prediction that a user will notice, interact with, or otherwise engage an associated digital content item.

In particular, the networking system 104 can determine a coefficient between the user and respective user-generated digital content items based on a variety of factors. For example, in one or more embodiments, the networking system 104 determines a coefficient between the user and a user-generated digital content item based on one or more characteristics associated with the user-generated digital content item. In particular, the networking system 104 may associate higher coefficient scores with high-quality images (e.g., high resolution, clear images) than with lower quality images. In addition, the networking system 104 can boost a coefficient where the user-generated digital content item includes a non-obstructed representation of the product (e.g., the front of the product) rather than a partial portion or non-ideal representation of the product. For example, in one or more embodiments, the networking system 104 may associate a higher coefficient with a user-generated digital content item showing the front of a hat (e.g., the identified product) than the back of the hat.

As another example, in one or more embodiments, the networking system 104 considers a relationship between the user of the mobile device 202 and the sharer (e.g., creator or original poster) of the user-generated digital content item (or simply "the content creator") in determining a coefficient between the user and the user-generated digital content item. For instance, in one or more embodiments, the networking system 104 determines a coefficient between a user and a content creator based on an identification that the user follows the content creator or that the user and content creator are mutual friends via the networking system 104. As another example, the networking system 104 can determine a coefficient between the user and content creator based on a number of shared follows or a number of common connections between the user and content creator. This, in one or more embodiments, the networking system 104 boosts a coefficient between a user and user-generated digital content items based on an identification that the user and content creator are mutual friends and/or have common connections (e.g., based on a number of common connections). Alternatively, the networking system 104 can decrease a coefficient for user-generated digital content items originating from non-friends or other non-associated users (e.g., having few or no common connections).

As used herein, a "content creator" refers to a user of the networking system 104 who originally uploads and/or shares a user-generated digital content items with other users of the networking system 104. For example, a content creator may refer to a user who causes a client device to upload a user-generated digital content item to the networking system 104 and provides access to the uploaded user-generated digital content item to any number of users associated with the content creator (e.g., friends, contacts, followers).

In addition to considering connections between the user and a content creator, the networking system 104 can additionally determine the coefficient based on one or more interactions between the user and content creator. For example, where the user has interacted with the content creator via direct messages, comments, user-ratings (e.g., likes, dislikes) with respect to networking posts, the networking system 104 may increase a coefficient between the user and any user-generated digital content items from the content creator.

The networking system 104 may additionally consider direct interactions between the user and user-generated digital content items having an identified product therein. For example, where a user has liked a user-generated digital content item, the networking system 104 can associate a high coefficient with the user-generated digital content item. In addition, or as an alternative, where the user has viewed, but not necessarily liked the user-generated digital content item, the networking system 104 can increase or decrease the coefficient associated with the user-generated digital content item. As another example, where the user has viewed and taken a screenshot using the mobile device 202, the networking system 104 can additionally increase the coefficient associated with the user-generated digital content item.

In addition to considering a relationship between the user and identified user-generated digital content items or between the user and the content creator(s), the networking system 104 can additionally consider relationships between connections of the user (e.g., mutual friends, followers, followees) and the content creators and/or the user-generated digital content items including the product. For example, where multiple friends of a user follow a content creator, the networking system 104 can assign a higher coefficient between the user and the user-generated digital content item including the product therein. As another example, where multiple friends of the user have liked a particular user-generated digital content item, the networking system 104 can similarly assign a higher coefficient between the user and the user-generated digital content item.

In addition, in one or more embodiments, the networking system 104 considers similarities between a user and a content creator in determining a coefficient for the user-generated digital content item. For example, where a user and content creator have a high degree of similarity (e.g., similar preferences, likes, interests, followers, followees), the networking system 104 can assign a high coefficient between the user and user-generated digital content items originating from the content creator and prioritize selecting those user-generated digital content items. Alternatively, where a user and content creator have very little or nothing in common on the networking system 104, the networking system 104 can assign a low coefficient between the user and user-generated digital content items originating from the content creator.

In one or more embodiments, the networking system 104 determines the coefficient based on other identified products shown within user-generated digital content items. For example, the networking system 104 may assign a higher coefficient between the user and user-generated digital content items that have multiple products identified therein. In one or more embodiments, the networking system 104 assigns a higher coefficient for user-generated digital content items having complimentary products. For example, the networking system 104 may assign a higher coefficient for images including products that frequently appear together or that are frequently purchased together.

In one or more embodiments, the networking system 104 determines the coefficient based on digital content preferences of the user. For example, the networking system 104 may assign higher coefficients to videos than images. In particular, where a user has a history of positive engagement (e.g., likes, comments, etc.) with videos than with images, the networking system 104 may assign a higher coefficient to user-generated videos than user-generated images (or vice versa). Thus, the collection of user-generated digital content items 418 may include one or more video previews (e.g., gifs, clips) within the immersive view 414 for the product based on identified preferences of the user of the mobile device 202.

As with determining the confidence score described above, the networking system 104 can similarly consider a combination of factors in determining the coefficient between a user and one or more user-generated digital content items to include within the collection of identified user-generated digital content items 418. For example, the networking system 104 may increase the coefficient based on one or more positive factors and decrease the coefficient based on one or more negative factors for the same user-generated digital content item. As an example, the networking system 104 may increase a coefficient for an image based on the image originating from a friend, but decrease the coefficient for the image based on a low quality of the image or the image including only a partial representation of the associated product.

Upon determining the coefficient for any number of user-generated digital content items, the networking system 104 can prioritize display of the user-generated digital content items within the immersive view 414 based on the coefficient. In particular, the networking system 104 can provide the user-generated digital content items having the highest coefficients within the immersive view 414. In addition, in one or more embodiments, the networking system 104 ranks the identified user-generated digital content items based on coefficient scores and presents the user-generated digital content items based on the associated rankings.

As shown in FIG. 4C, the networking system 104 provides the collection of user-generated digital content items 418 within a side-scrolling menu with the user-generated digital content items ordered from left to right (e.g., based on associated coefficients with the user of the mobile device 202). As an alternative to providing multiple user-generated digital content items as shown in FIG. 4C, the networking system 104 can alternatively present the highest-ranked user-generated digital content item within the immersive view 414 as an example to the user of the mobile device 202.

The networking system 104 can present the user-generated digital content items in a variety of ways. For example, FIG. 4D illustrates an example of the immersive view 414 including a grid 426 of user-generated digital content items including the product of the immersive view 414 shown therein. In particular, as shown in FIG. 4D, the networking system 104 presents the user-generated digital content items within the grid 426 in accordance with the determined rankings based on the coefficients with the respective user of the mobile device 202 (e.g., the user associated with the user-profile shown in FIG. 4A).

Additional detail will now be given with respect to generating and providing a creation insight to a merchant, influencer, end-user, or other entity of the networking system 104. In particular, as mentioned above, in one or more embodiments, the networking system 104 analyzes a plurality of digital content items (e.g., user-generated digital content items) including one or more products shown therein. Based on the analysis, the networking system 104 identifies various combinations of products from a product catalog predicted to solicit a positive response or otherwise engage users of the networking system 104. In particular, as shown by way of example in FIGS. 5A-5B, the networking system 104 generates a provides a creation insight including an identification of a combination of products. In particular, FIGS. 5A-5B show an example mobile device 202 including a touch screen display 204 providing a system interface 206 associated with the networking system 104 and which shows features and functionality with respect to providing a creation insight to an administrative user (e.g., merchant), end-user, or other entity of the networking system 104.

For example, FIG. 5A shows an example profile display 502 for a merchant ("Palm Clothing") associated with a username ("palmclothing"). As shown in FIG. 5A, the profile display 502 includes a profile description 504 including information associated with the merchant. In particular, the profile description 504 includes a profile image, a number of posts shared by the merchant, a number of followers of the merchant, a number of users that the merchant is following, and other information (e.g., a bio) associated with the networking account of the merchant. As further shown, the profile display 502 includes networking posts 506 including posted digital content items. In particular, the profile display 502 includes thumbnails or other images representative of any number of posts 506.

In one or more embodiments, the networking system 104 provides access to the posted digital content items to any of the followers of the merchant. Thus, the networking system 104 provides access to any one of the 4,112 posts of the merchant to the 2.1 million followers of the merchant. In one or more embodiments, the networking system 104 identifies one or more products shown within the digital content items posted by the merchant. For example, the networking system 104 can identify products shown within the posted digital content items in accordance to one or more embodiments described above.

In addition, the networking system 104 can track interactions of various users with the posts 506. For example, the networking system 104 can track user interactions with digital content items. In addition, the networking system 104 can track user interactions with respect to products shown within digital content items. Further, the networking system 104 can other types of user interactions with respect to networking posts and digital content items shared with other users of the networking system 104.

As an example, in one or more embodiments, the networking system 104 tracks user-ratings with respect to the posts 506. In particular, the networking system 104 tracks likes, dislikes, and other types of user-ratings shared with respect to the posted digital content items. For instance, where an administrative user of a merchant account posts a digital content item including an image of a piece of clothing, the networking system 104 tracks a number of ratings, the types of ratings (e.g., positive, negative ratings), and the demographics of users providing the ratings for the posted content.

In addition to tracking user-ratings, the networking system 104 can additionally track messages, comments, and other responses from users of the networking system 104 made in connection with the posts 506. In particular, the networking system 104 can identify a number of responses (e.g., messages, comments) and analyze the responses to identify positive and/or negative responses. In addition, in one or more embodiments, the networking system 104 further identifies those users who provide the responses to identify demographics of networking users who respond to particular posts.

In one or more embodiments, the networking system 104 further tracks saved posts and self-sent messages by users of the networking system 104. For example, the networking system 104 identifies when a viewer of a post send a self-directed message to himself or otherwise saves a message to view later. In addition, in one or more embodiments, the networking system 104 detects when a user saves a post by taking a screenshot of the post using a respective client device. As another example, in one or more embodiments, the networking system 104 detects when a user saves a digital content item shown within a post to a local storage of the respective client device.

In addition to tracking user interactions with respect to the posts 506, the networking system 104 further tracks user interactions with respect to products shown within the posts 506. For example, as described above, the networking system 104 can identify any number of posts shown within respective digital content items and enable viewers of the digital content items to select the products shown therein. As such, in one or more embodiments, the networking system 104 tracks user-selections of the products shown within the posts 506 including, for example, whether a user selects a "reveal products" icon to view products tagged within the post. In addition, the networking system 104 detects whether the viewer of the digital content item selects one or more of the respective products causing the networking system 104 to provide an immersive view corresponding to a selected product.

Further, in one or more embodiments, the networking system 104 tracks interactions with respect to an immersive view for a selected product. For example, the networking system 104 can detect how long an immersive view is shown on a client device. As another example, the networking system 104 tracks interactions of the user within the immersive view. For instance, the networking system 104 can detect user-selections of tagged products, collections icons, and user-generated digital content items.

The networking system 104 can additionally track interactions with respect to multiple products shown in combination. For example, rather than tracking interactions in isolation with respect to individual products, the networking system 104 can track whether certain combinations of products shown within a digital content item prompt users to select multiple products and interact within immersive views for each of the multiple products shown within the digital content item.

In addition to tracking whether a user selects a product and views an immersive view for a product, the networking system 104 further tracks conversion rates for products shown within the posts 506. For example, in one or more embodiments, the networking system 104 tracks whether a user ultimately purchases a product via the system interface 206 of the networking system 104. Alternatively, in one or more embodiments, the networking system 104 tracks whether a user purchases a product via a third-party website. For example, the networking system 104 can track third-party website purchases based on information received from a merchant to the networking system 104 associated with the sold product(s). As another example, the networking system 104 can track third-party website purchases based on tracking pixels or other metrics.

As mentioned above, in one or more embodiments, the networking system 104 further tracks the identities of users of the networking system 104 who perform the various interactions with respect to the posts 506. In addition, in one or more embodiments, the networking system 104 tracks demographics of the users associated with the respective interactions. As such, in one or more embodiments, the networking system 104 can determine that women within a certain age range more frequently interact with and purchase hair products shown within the posts 506 while men within a certain age range more frequently interact with and purchase electronic products shown within the posts 506. Thus, the networking system 104 can determine engagement scores between products (or combinations of products) and demographics of users of the networking system 104.

Based on the tracked interactions, the networking system 104 determines one or more engagement scores for the products shown within the posts 506. In particular, in one or more embodiments, the networking system 104 determines engagement scores indicative of whether a product or combination of products that solicit a positive reaction or otherwise engages users of the networking system 104 when shown within digital content items shared via the networking system 104. Thus, in one or more embodiments, the networking system 104 determines engagement scores for products shown within the posts 506 that correspond to Thus, in one or more embodiments, the networking system 104 determines engagement scores for products shown within the posts 506. In addition, or as an alternative, in one or more embodiments, the networking system 104 determines engagement scores for different types of products. For example, in addition or as an alternative to associating engagement scores with only those products shown within the posts 506, in one or more embodiments, the networking system 104, the networking system 104 can determine and associate engagement scores with types or categories of products (e.g., women shoes, dress pants, green skirts, etc.). In addition, the networking system 104 can determine and associate engagement scores with combinations of different types or categories of products. Thus, the networking system 104 can determine engagement scores associated with a level of user-engagement with combinations of different types of products (e.g., camping gear with jackets, high-heels with dresses).

In addition to associating engagement scores with specific products and/or types of products, the networking system 104 can additionally associate engagement scores with populations of users of the networking system 104. For instance, the networking system 104 can associate an engagement score with a demographic of networking users and a product or type of product. As an example, the networking system 104 can associate an engagement score associated with winter scarves (or other product) based on identifying that a high number of female users of the networking system 104 engage with digital content items in which winter scarves are shown.

Based on the engagement score(s) for the products (and corresponding types of products) shown within the posts 506, the networking system 104 identifies one or more combinations of products predicted to engage users or followers of the user (e.g., administrative user for a merchant) when included within a digital content item. Upon identifying the products or types of products, the networking system 104 generates a creation insight including an identification of the products or types of products to provide to a merchant, influencer, or other user of the networking system 104. For instance, in one or more embodiments, the networking system 104 provides the creation insight within the system interface 206 of the networking system 104 and provides the creation insight within an insight interface 508, as shown in FIG. 5B In particular, FIG. 5B provides a creation insight by providing an insight interface 508 including identified products 510*a*-*b*. For example, the insight interface 508 includes a first product 510*a* corresponding to a t-shirt and a second product 510*b* corresponding to a pair of high-top sneakers. While FIG. 5B illustrates a creation insight including two specific products corresponding to specific merchants, in one or more embodiments, the networking system 104 provides a creation insight showing different types of products unaffiliated with any specific merchant. Additionally, the networking system 104 can provide a creation insight including products corresponding to the same merchant or products from different merchants.

As further shown in FIG. 5B, the insight interface 508 includes sample user-generated digital content items 512 in which the identified combination of products is shown. For example, in one or more embodiments, the networking system 104 identifies sample user-generated digital content items 512 shared by various users of the networking system 104 and provides, within the insight interface 508, any number of the sample identified user-generated digital content items 512 for display within the system interface 206. Thus, a user of the mobile device (e.g., merchant, influencer, end-user) can view one or more example posts from various users of the networking system 104 in which the identified combination of products are shown.

Moreover, in one or more embodiments, the networking system 104 includes a combination of products shown within the plurality of posts 506 shared by the user of the mobile device 202. For example, in one or more embodiments, each of the first product 510a and the second product 510b refer to products provided within one or more of the 4,112 posts by an administrative user of the account for Palm Clothing. Nevertheless, in one or more embodiments, the networking system 104 generates a creation insight including one or more products not explicitly shown within the posts 506, but are nonetheless predicted to solicit positive reactions and high engagement from users of the networking system 104 based on determined engagement scores associated with similar types of products.

In one or more embodiments, the networking system 104 provides multiple creation insights for different populations of users of the networking system 104 including different identified products. For example, while FIG. 5B illustrates a single creation insight shown within the insight interface 508 geared towards a specific demographic, the networking system 104 can similarly provide multiple creation insights within the same or separate insight interfaces. In particular, in one or more embodiments, the networking system 104 provides a different creation insight for one of a plurality of discrete populations of users including different combinations of products predicted to engage the discrete populations of users when included within shared digital content items.

In this way, the networking system 104 provides a template or recommendation for users of the networking system 104 for sharing subsequent posts with users of the networking system 104. For example, in one or more embodiments, an administrative user of the merchant account can capture, produce, or otherwise find a new digital content item including the recommended combination of products (or types of products) and share the new digital content item with followers of a networking account. In which way, a user of the networking account can effectively engage followers and other users of the networking system 104 associated with the user.

In addition or as an alternative to providing a creation insight including an identification of one or multiple products, the networking system 104 can additionally search a database associated with a respective user and identify one or more digital content items (e.g., user-generated digital content items) to recommend to the user for a subsequent post. For example, in one or more embodiments, the networking system 104 searches a local storage (e.g., a camera roll) of a client device and determines engagement scores for images (or other user-generated digital content items) within the local storage that predict user-engagement with the images of the local storage. The networking system 104 can further generate a creation insight including an identification of one or more images from the local storage based on the associated engagement scores (e.g., having the highest engagement scores).

Thus, in one or more embodiments, the networking system 104 generates and provides a creation insight including an identification of a user-generated digital content item located in a storage of a client device based on a determination of engagement scores for user-generated digital content items from the storage. In one or more embodiments, the networking system 104 can similarly search a database of images, videos, or other user-generated digital content items within a remote storage space (e.g., cloud storage space) associated with the user of the client device.

Figure 6:
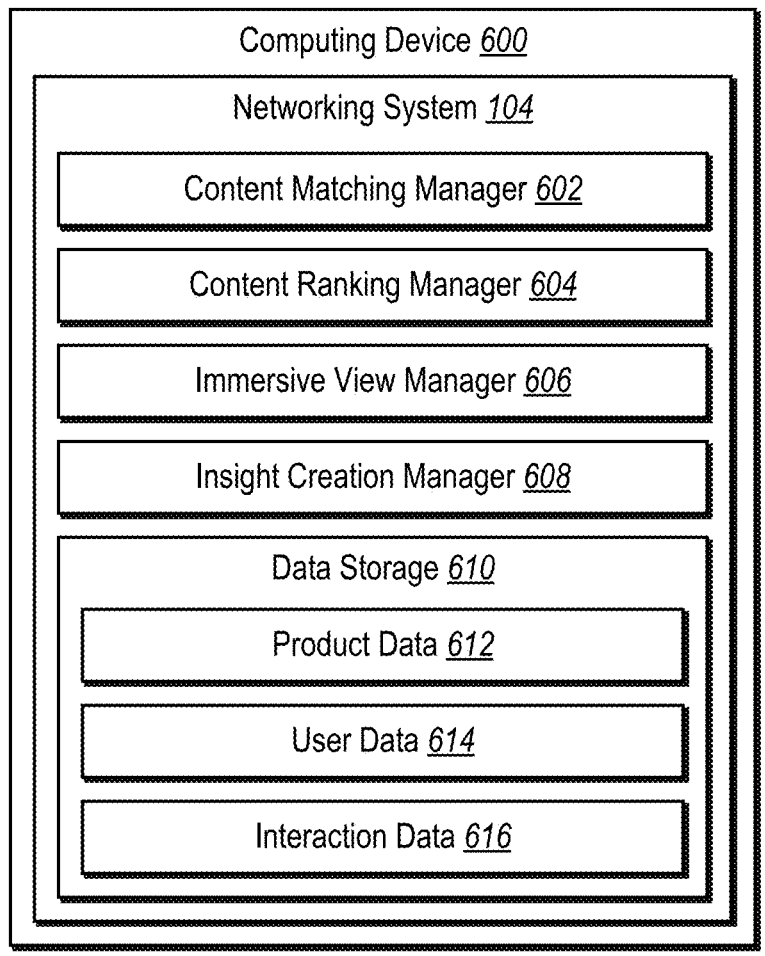
FIG. 6 illustrates a schematic diagram illustrating a networking system in accordance with one or more embodiments.

Turning now to FIG. 6, additional detail will be provided regarding components and capabilities of an example architecture for the networking system 104 that may be implemented on the server device(s) 102, client devices 106a-n, or on a combination of the server device(2) 102 and one or more client devices 106a-n. In particular, FIG. 6 illustrates an embodiment of an example networking system 104 that accomplishes features and functionality associated with one or more embodiments described above. For example, the networking system 104 facilitates identifying products from a product catalog shown within digital content items and associating the identified products with the respective digital content items. In addition, the networking system 104 facilitates selectively identifying digital content items having an identified product therein and providing the selectively identified digital content items to a specific user of the networking system 104 (e.g., within an immersive view for the product). Moreover, the networking system 104 facilitates generating a creation insight and providing the creation insight to a user of the networking system 104 within a graphical user interface associated with the networking system 104.

In particular, FIG. 6 illustrates an example computing device 600 including a networking system 104 implemented thereon. As further shown, the networking system 104 includes a content matching manager 602, content ranking manager 604, immersive view manager 606, an insight creation manager 608, and a data storage 610 including, for example, product data 612, user data 614, and interaction data 616.

As discussed in one or more embodiments, the networking system 104 identifies objects that appear within digital content items (e.g., user-generated digital content items) and associates the objects with products from a product catalog. In particular, in one or more embodiments, the content matching manager 602 analyzes a plurality of factors (e.g., signals) associated with a digital content item and determines, based on the plurality of factors, a confidence score associated with a likelihood that a product from the product catalog appears within the digital content item. For example, the content matching manager 602 can determine the confidence score from a variety of factors including an analysis of a display of the digital content item (e.g., an analysis of the pixels of an image), user-interactions with respect to the digital content item, a relationship of a content creator of the digital content item with other users of the networking system 104, and other factors and signals discussed above.

In one or more embodiments, the content matching manager 602 determines the confidence score based on a machine learning model. For example, in one or more embodiments, the content matching manager 602 utilizes a machine learning model to develop an algorithm that considers and weights various factors for determining the confidence score for respective objects and products. For instance, the content matching manager 602 can utilize training data including digital content items known to include or otherwise correspond with products from the product catalog. The content matching manager 602 can utilize the training data to develop an algorithm or machine learning model for determining confidence scores for digital content items received via subsequent networking posts by users of the networking system 104. In one or more embodiments, the content matching manager 602 develops multiple machine learning models for respective products that consider various factors differently. Thus, in one or more embodiments, the content matching manager 602 considers various factors differently for individual products from the product catalog.

In addition, in one or more embodiments, the content matching manager 602 further refines the machine learning model(s) over time and based on additional information received. For example, where a user, merchant, or other entity overrides an association or otherwise indicates that the content matching manager 602 made an incorrect association with a product, the content matching manager 602 can modify the relevant algorithm and/or machine learning model accordingly. In addition, where the networking system 104 receives additional information (e.g., user information, product information), the content matching manager 602 can similarly update the algorithms and/or machine learning models according to the received information.

As discussed in one or more embodiments, the networking system 104 further selectively identifies digital content items to provide to a particular user. For instance, in addition to generally associating products with digital content items, the content ranking manager 604 can additional rank the digital content items for individual users. As an example, where a user interacts with a user-generated digital content item by selecting a product shown therein (thus prompting display of an immersive view for the product), the content ranking manager 604 determines a coefficient between the user and any number of user-generated digital content items. In particular, the content ranking manager 604 determines the coefficient based on a variety of factors including, for example, a quality of a user-generated digital content item, a relationship between the user and a content creator for the user-generated digital content item, interactions between the user and the content creator, and other factors described above that contribute to a likelihood that the user will notice and engage with a user-generated digital content item.

Similar to one or more embodiments described in connection with determining the confidence score, the content ranking manager 604 can determine the coefficient between the user and user-generated digital content items based on a machine learning model. For example, the content ranking manager 604 can utilize training data including determined or otherwise identified coefficients between users and corresponding digital content items to develop an algorithm for determining coefficients between a user of the networking system and a given user-generated digital content item. In addition, the content ranking manager 604 can change or update the machine learning model(s) based on additionally received information.

As discussed in one or more embodiments, the networking system 104 further provides an immersive view for a product based on (e.g., in response to) a user-selection of a product within a digital content item (e.g., a user-generated digital content item). For example, in one or more embodiments, the immersive view manager 606 provides an immersive view within a graphical user interface of the networking system 104 including information about a selected product (e.g., information from the product catalog) and selectable options to enable a user to view user-generated digital content items, related products, collections, and ultimately purchase the selected product, as discussed in one or more embodiments described above.

In one or more embodiments, the immersive view manager 606 generates the immersive view based on information received from an administrative user associated with a product. For example, the immersive view manager 606 can receive the image or video for a product from the administrative user for the product and insert the image or video within an immersive view template corresponding to the product. When a user subsequently selects the product within another digital content item, the immersive view manager 606 can provide the immersive view including any images or videos provided by the administrative user associated with the product within designated portions of the immersive view.

In addition, as described in one or more embodiments herein, the immersive view manager 606 provides one or more user-generated digital content items within the immersive view for a selected product. For example, in one or more embodiments, the immersive view manager 606 places one or more user-generated digital content items within an immersive view based on user-generated digital content items associated with the selected product by the content matching manager 602 and user-generated digital content items selected for a user by the content ranking manager 604. In one or more embodiments, the immersive view manager 606 places the identified user-generated digital content items within a designated spot of an immersive view template for the selected product.

As further discussed above, the networking system 104 generates and provides creation insights to users of the networking system 104 including an identification of one or more products predicted to engage users of the networking system 104. For example, in one or more embodiments, the insight creation manager 608 receives a plurality of posts including digital content items posted by a user of the networking system. The insight creation manager 608 further identifies a plurality of products from the product catalog within the plurality of posts. For example, the content matching manager 602 can identify and associate any number of products within the posted digital content items with corresponding products from a product catalog, similar to one or more embodiments described herein.

Further, the insight creation manager 608 can track interactions by users of the networking system with respect to the plurality of posts and determine engagement scores based on the tracked user interactions. For example, the insight creation manager 608 can track user-ratings, comments, messages, saved posts, and other interactions with respect to the plurality of posts. Based on the tracked interactions, the insight creation manager 608 can identify trends of interactions and identify products that solicit a positive response from users as well as identify demographics of users that interact with digital content items associated with respective products.

Based on the engagement score(s), the insight creation manager 608 can generate a creation insight including an identification of two or more products (or types of products) predicted to engage users of the networking system 104. In particular, the insight creation manager 608 can provide an insight interface including an identification of two or more products to an administrative user as a recommendation or template for a subsequent networking post that will solicit a positive response from users of the networking system 104. In one or more embodiments, the insight creation manager 608 identifies a combination of products different from the products shown within the plurality of posts. Alternatively, in one or more embodiments, the insight creation manager 608 identifies a combination of products from the plurality of posts. In addition, in one or more embodiments, the insight creation manager 608 provides one or more user-generated digital content items including instances of the identified products shared by various users of the networking system 104.

As further shown in FIG. 6, the networking system 104 incudes data storage 610 including product data 612. In one or more embodiments, the product data 612 refers to information about any products from a product catalog. In particular, the product data 612 can refer to any information about a product included within the product catalog. Examples of product data 612 include general information about a product (e.g., price, brand, merchant, color, size, shipping information, etc.), images or videos associated with the product, and any digital content items and information included within an immersive view for the product.

As shown in FIG. 6, the data storage 610 further includes user data 614. In one or more embodiments, the user data 614 includes any information about a user of the networking system. For example, user data 614 includes profile information including, for example, demographic information, preferences, personal information, and other data received from a user and/or one or more associated users of the networking system. The user data 614 can further include an identification of an administrative user associated with a respective brand or merchant.

Moreover, the data storage 610 includes interaction data 616 including any information associated with interactions between a user and the networking system 104. For example, interaction data 616 includes user-ratings, comments, messages, and other interactions received with respect to a post or digital content item shared via the networking system 104. In addition, the interaction data 616 can include relationship information between a user and other users of the networking system. Further, the interaction data 616 can include interactions between a user and a product and/or between a user and an immersive view for the product. The interaction data 616 can further include purchase data associated with whether a user purchased a product via the networking system 104 or via one or more third-party web sites.

Figure 7:
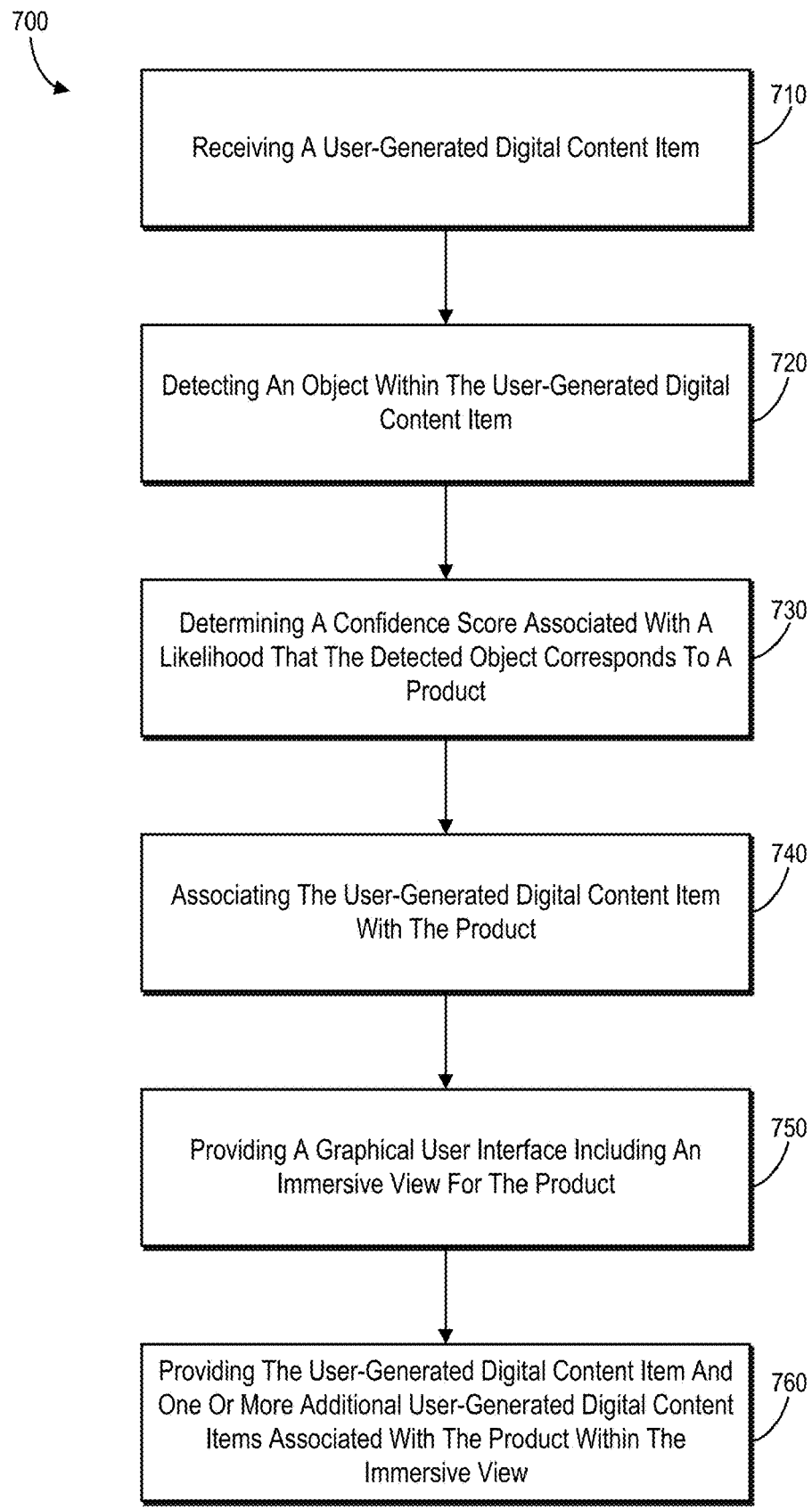
FIG. 7 illustrates a flow diagram of a method for identifying products within user-generated digital content in accordance with one or more embodiments.
Figure 8:
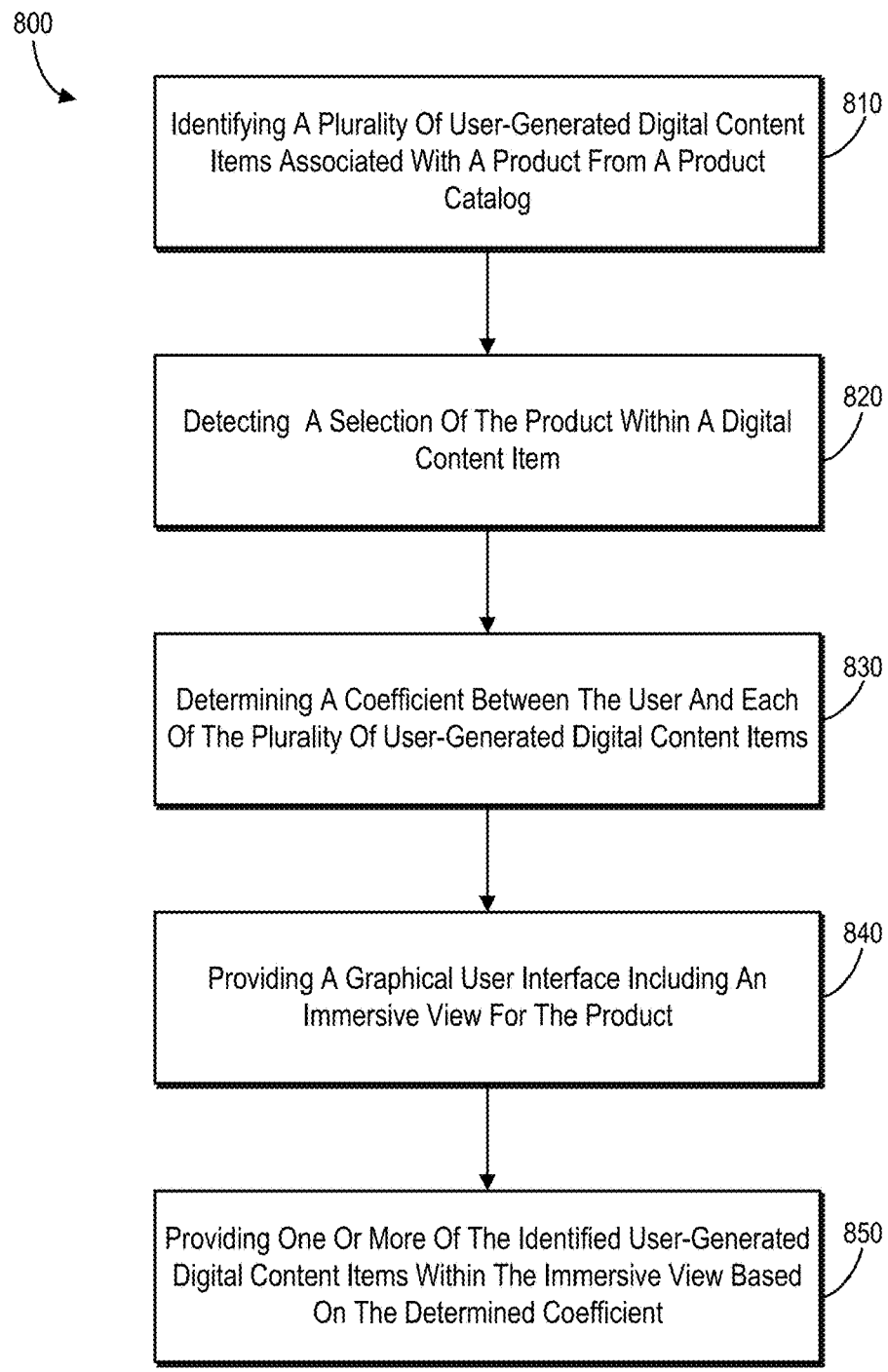
FIG. 8 illustrates a flow diagram of a method for ranking user-generated digital content items having products identified therein in accordance with one or more embodiments.
Figure 9:
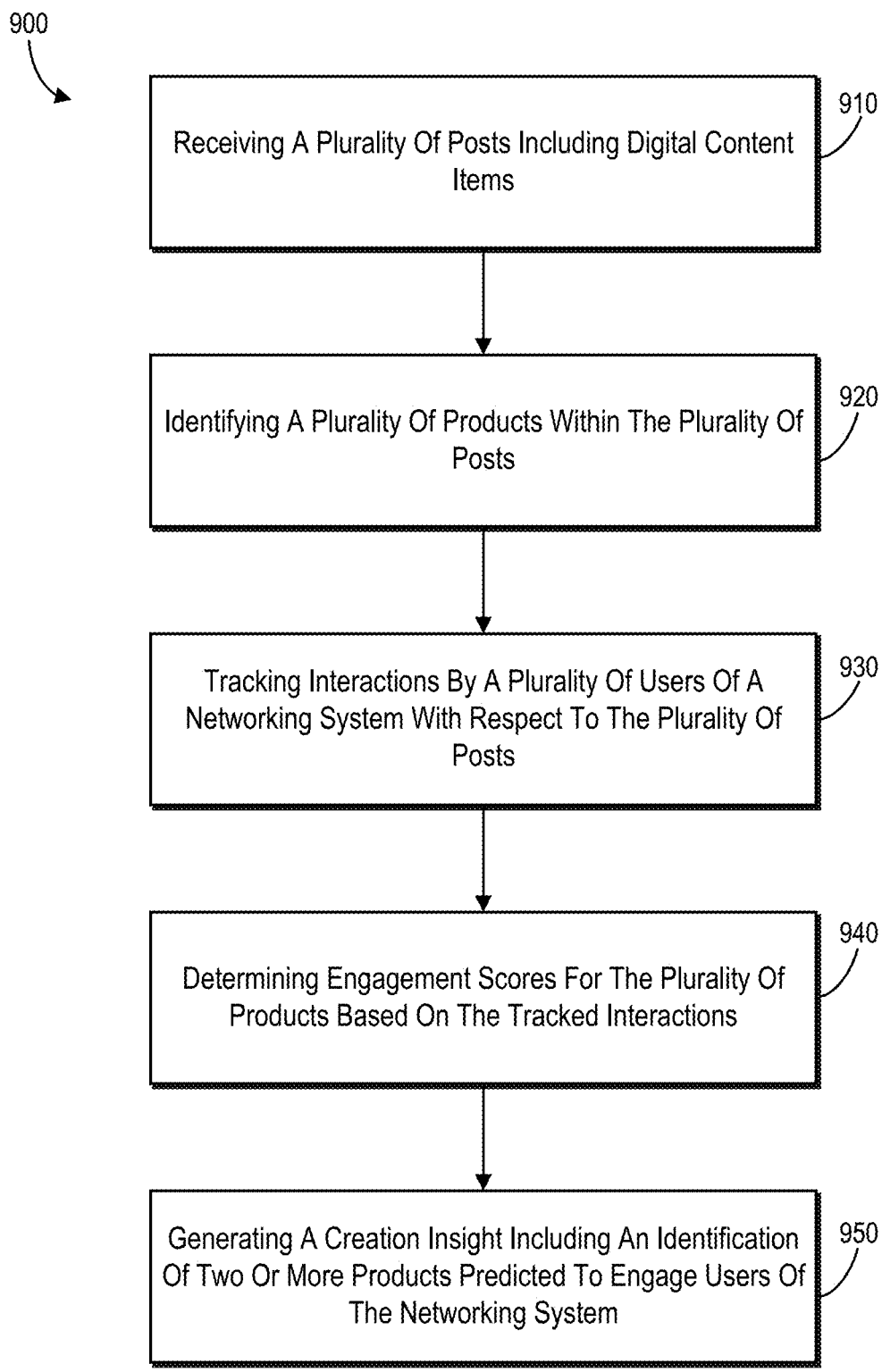
FIG. 9 illustrates a flow diagram of a method for generating and providing a creation insight in accordance with one or more embodiments.

FIGS. 1-6, the corresponding text, and the examples, provide a number of different systems and devices that facilitate user-interaction with respect to digital content items including products shown therein and enabling users of a networking system 104 to receive information about one or more selected products. In addition to the foregoing, embodiments can also be described in terms of flowcharts comprising acts in a method for accomplishing a particular result. For example, FIG. 7 illustrates a flowchart of an exemplary method for associating products from a product catalog with user-generated digital content items. In addition, FIG. 8 illustrates a flowchart of an exemplary method for enabling a user to select a product from within a user-generated digital content item and selectively identifying other user-generated digital content items for a specific user to include within an immersive view for the selected product. Moreover, FIG. 9 illustrates a flowchart of an exemplary method for generating and providing a creative insight including an identification of two or more products from a product catalog predicted to engage users of the networking system 104.

FIG. 7 illustrates a flowchart of one example method 700 for associating a user-generated digital content item with a product and enabling one or more users (e.g., users 108a-n) to interact with the user-generated digital content item to receive information about the associated product. As shown in FIG. 7, the method 700 includes an act 710 of receiving a user-generated digital content item. In particular, in one or more embodiments, the act 710 includes receiving, from a user of a networking system 104, a user-generated digital content item. In addition, the method 700 includes an act 720 of detecting an object within the user-generated digital content item. In one or more embodiments, detecting the object involves analyzing pixels of the user-generated digital content item and detecting the object therein.

As further shown in FIG. 7, the method 700 includes an act 730 of determining a confidence score associated with a likelihood that the detected object corresponds to a product. In particular, in one or more embodiments, the act 730 includes determining a confidence score associated with a likelihood that the detected object corresponds to a product from a product catalog. The product catalog includes a plurality of products associated with corresponding brands or merchants. As described above, determining the confidence score can involve determining the confidence score based on various factors (e.g., a combination of different factors).

For example, in one or more embodiments, the method 700 includes receiving a user-identification of the product from the product catalog with respect to the user-generated digital content item and determining the confidence score based on the received user-identification of the product from the product catalog. In one or more embodiments, determining the confidence score further comprises analyzing a display of the user-generated digital content item to confirm the user-identification of the product from the product catalog.

As another example, in one or more embodiments, the method 700 incudes identifying one or more hashtags associated with the product within a networking post associated with the user-generate digital content item and determining the confidence score based on the identified one or more hashtags. The method 700 can further include identifying other contextual cues (e.g., in addition to or as an alternative to hashtags) within the networking post and determining the confidence score based on the other contextual cues.

As another example, in one or more embodiments, the method 700 includes identifying a purchase by the user of the product from the product catalog and determining the confidence score based on the identified purchase of the product. In one or more embodiments, the method 700 includes identifying the purchase by detecting a purchase of the product by the user via the networking system 104. In addition or as an alternative, in one or more embodiments, the method 700 includes identifying the purchase by detecting a purchase of the product by the user via a third-party website.

As another example, in one or more embodiments, the method 700 includes tracking user-interactions by the user with respect to one or more brands of products from the product catalog. In one or more embodiments, tracking user-interactions with respect to the one or more brands of products from the product catalog includes tracking comments and user-ratings with respect to networking posts associated with the one or more brands of products from the product catalog. In one or more embodiments, tracking user-interactions with respect to the one or more brands of products from the product catalog includes tracking self-directed messages (e.g., saved messages) with respect to networking posts associated with the one or more brands of products from the product catalog. In one or more embodiments, tracking user-interactions with respect to one or more brands of products includes identifying that the user is following one or more merchants associated with the one or more brands of products from the product catalog. In addition, in one or more embodiments, the method 700 includes tracking user-interactions by other users of the networking system 104 associated with the user with respect to the one or more brands of products from the product catalog and determining the confidence score based on the tracked user-interactions by the other users with respect to the one or more brands of products from the product catalog.

Moreover, in one or more embodiments, the method 700 includes determining the confidence score based on a combination of different factors. For example, in one or more embodiments, the method 700 includes determining a likelihood that the detected object corresponds to the product from the product catalog based on a combination of at least two or more of: a received user-identification of the product from the product catalog with respect to the user-generated digital content item, an analysis of a display of the user-generated digital content item, one or more identified purchases of the product by the user, and tracked user-interactions by the user with respect to one or more brands of products from the product catalog.

As further shown in FIG. 7, the method 700 includes an act 740 of associating the user-generated digital content item with the product. In particular, in one or more embodiments, the act 740 includes associating, based on the confidence score, the user-generated digital content item with the product from the product catalog. In one or more embodiments, associating the user-generated digital content item with the product from the product catalog includes determining that the confidence score exceeds a threshold score associated with a corresponding likelihood that the detected object corresponds to the product from the product catalog. In response to determining that the confidence score exceeds the threshold score, associating the user-generated digital content item with the product involves tagging the user-generated digital content item with the product from the product catalog.

As further shown in FIG. 7, the method 700 includes an act 750 of providing a graphical user interface including an immersive view for the product. In particular, in one or more embodiments, the act 750 includes providing a graphical user interface including an immersive view for the product. In one or more embodiments, the method 700 includes providing the graphical user interface including the immersive view in response to a user selection of a product. For example, in one or more embodiments, the method 700 includes providing, via the graphical user interface, a selectable element with respect to the detected object within the user-generated digital content item. In one or more embodiments, providing the graphical user interface including the immersive view for the product by providing the immersive view for the product in response to detecting a selection of the selectable element with respect to the detected object within the user-generated digital content item. In one or more embodiments, the method 700 includes providing a shopping element within the immersive view for the product. In response to detecting a selection of the shopping element, in one or more embodiments, the method 700 includes providing a shopping interface within the graphical user interface that enables the user of the networking system 104 to purchase the product.

In one or more embodiments, the method 700 further includes an act 760 of providing the user-generated digital content item and one or more additional user-generated digital content items associated with the product within the immersive view. For example, in one or more embodiments, the act 760 includes providing, within the immersive view for the product, the user-generated digital content item and one or more additional user-generated digital content items associated with the product.

In one or more embodiments, the method 700 includes detecting a second object within the user-generated digital content item. In addition, in one or more embodiments, the method 700 includes determining a second confidence score associated with a likelihood that the detected object corresponds to a second product from the product catalog. Further, in one or more embodiments, the method 700 includes associating, based on the second confidence score, the user-generated digital content item with the second product from the product catalog. In one or more embodiments, the method 800 further includes providing, within the graphical user interface, the user-generated digital content item including selectable elements corresponding to the detected object and the second detected object. In one or more embodiments, the method 800 provides an immersive view for the product or second product based on detecting a user-selection of a selectable element corresponding to the detected object or the second detected object.

FIG. 8 illustrates a flowchart of an example method 800 for determining coefficients between a user and user-generated digital content items and presenting the ranked user-generated digital content items in accordance with the determined coefficients.

For example, as shown in FIG. 8, the method 800 includes an act 810 of identifying a plurality of user-generated digital content items associated with a product from a product catalog. In particular, in one or more embodiments, the act 810 includes identifying, from a plurality of networking posts, a plurality of user-generated digital content items associated with a product from a product catalog, the product catalog including a plurality of products. As further shown in FIG. 8, the method 800 includes an act 820 of detection a selection of the product within a digital content item. In particular, in one or more embodiments, the act 820 includes detecting a selection of the product within a digital content item by a user of a networking system 104.

As further shown in FIG. 8, the method 800 includes an act 830 of determining a coefficient between the user and each of the plurality of user-generated digital content items. In particular, in one or more embodiments, the act 830 includes determining a coefficient between the user and each of the plurality of user-generated digital content items associated with the product. Further, in one or more embodiments, the method 800 includes determining the coefficient for each of the plurality of user-generated digital content items based on a determined relationship between the user and content creators where the content creators include users of the networking system 104 associated with sharing the plurality of user-generated digital content items with other users of the networking system 104. In addition, in one or more embodiments, the method 800 includes determining the coefficient for each of the plurality of user-generated digital content items based on the determined relationship between the user and content creators.

In one or more embodiments, the method 800 includes determining the relationship between the user and content creators based on whether the user follows the content creators via the networking system 104. In addition, in one or more embodiments, the method 800 includes determining the relationship between the user and content creators based on a number of common connections between the user and the content creators via the networking system 104. In addition, in one or more embodiments, the method 800 includes determining the relationship between the user and content creators based on interactions between the user and the content creators for each of the plurality of user-generated digital content items. In one or more embodiments, the interactions between the user and content creators include one or more of ratings and comments made by the user with respect to digital content items shared by the content creators. In one or more embodiments, the method 800 includes determining the coefficient between the user and each of the plurality of user-generated digital content items associated with the product based on interactions between the user with respect to each of the plurality of user-generated digital content items.

In one or more embodiments, the method 800 includes determining the coefficient based on a combination of two or more factors. For example, in one or more embodiments, the method 800 includes determining the coefficient between the user and each of the plurality of user-generated digital content items associated with the product based on a combination of at least two or more of: a number of common connections between the user and content creators associated with sharing the plurality of user-generated digital content items, interactions between the user and the content creators for each of the plurality of user-generated digital content items, and one or more ratings and comments made by the user with respect to the plurality of digital content items.

As further shown in FIG. 8, the method 800 includes an act 840 of providing a graphical user interface including an immersive view for the product. As further shown, the method 800 includes an act 850 of providing one or more of the identified user-generated digital content items within the immersive view based on the determined coefficient. In particular, in one or more embodiments, the act 850 includes providing, within the immersive view for the product, one or more of the identified user-generated digital content items based on the determined coefficient.

In one or more embodiments, the method 800 includes determining rankings for the plurality of user-generated digital content items based on the determined coefficient between the user and each of the plurality of user-generated digital content items. In addition, in one or more embodiments, the method 800 includes presenting the one or more identified user-generated digital content items in an order within the immersive view based on the determined rankings for the plurality of user-generated digital content items. In one or more embodiments, the method 800 includes identifying a user-generated digital content item from the plurality of user-generated digital content items having the highest coefficient of the plurality of user-generated digital content items. In addition, in one or more embodiments, the method 800 includes providing the identified user-generated digital content item having the highest coefficient of the plurality of user-generated digital content items within the immersive view for the product.

In one or more embodiments, the method 800 includes providing, within the graphical user interface and prior to detecting the selection of the product within the digital content item, the digital content item and a selectable element corresponding to the product within the digital content item. In addition, in one or more embodiments, the digital content item includes a user-generated digital content item shared from a co-user of the networking system 104 unaffiliated with a brand of the product. Further, in one or more embodiments, the digital content item includes a digital content item from a co-user of the networking system 104 affiliated with a brand of the product.

In one or more embodiments, the method 800 includes providing, within the immersive view for the product, one or more images corresponding to one or more additional products tagged within the digital content item. In addition, in one or more embodiments, the method 800 includes providing, within the immersive view for the product, at least one image provided by an account of the networking system 104 affiliated with a brand of the product.

In one or more embodiments, the method 800 includes providing, within the immersive view for the product, a selectable image for a related product to the selected product. In addition, in response to detecting a selection of the selectable image for the related product, in one or more embodiments, the method 800 includes providing, within the graphical user interface an immersive view for the related product.

FIG. 9 illustrates a flowchart of an example method 900 for generating and providing a creation insight to a user of the networking system 104. For example, as shown in FIG. 9, the method 900 includes an act 910 of receiving a plurality of posts including digital content items. In particular, in one or more embodiments, the act 910 includes receiving, at a networking system 104, a plurality of posts comprising digital content items.

As further shown in FIG. 9, the method 900 includes an act 920 of identifying a plurality of products within the plurality of posts. In particular, in one or more embodiments, the act 920 includes identifying, within the digital content items, a plurality of products from a product catalog, the product catalog comprising a collection of products. In one or more embodiments, identifying the plurality of products includes determining, for each of the digital content items, a confidence score associated with a likelihood that a digital content item includes an object therein corresponding to a product from the collection of products. In addition, in one or more embodiments, identifying the plurality of products includes identifying the plurality of products within the digital content items based on determined confidence scores for the digital content items.

As further shown in FIG. 9, the method 900 includes an act 930 of tracking interactions by a plurality of users of the networking system 104 with respect to the plurality of posts. In one or more embodiments, tracking the interactions includes tracking a number of self-directed messages, time spent viewing posts, and a number of saved posts of the plurality of posts. In one or more embodiments, tracking the interactions includes tracking user-interactions with respect to the plurality of products appearing within the plurality of posts. In one or more embodiments, tracking the interactions includes tracking interactions with respect to immersive views provided by the networking system 104 in connection with the user-interactions with respect to the plurality of products within the plurality of posts. In one or more embodiments, tracking the interactions includes tracking purchases by users of the networking system 104 with respect to the plurality of products shown within the plurality of posts.

As further shown in FIG. 9, the method 900 further includes an act 940 of determining engagement scores for the plurality of products based on the tracked interactions. In particular, in one or more embodiments, the act 940 includes determining engagement scores for the plurality of products from the product catalog based on the tracked interactions with respect to the plurality of posts. In one or more embodiments, the method 900 includes determining the engagement scores based on user-ratings received in connection with the plurality of posts. In one or more embodiments, the method 900 includes determining the engagement scores based on a number of detected messages in connection with the plurality of posts sent to a content creator associated with sharing the posts from users of the networking system 104. In one or more embodiments, the method 900 includes determining the engagement scores based on a detected number of comments by users of the networking system 104 received in response to the plurality of posts.

In one or more embodiments, the method 900 includes determining the engagement score based on a combination of multiple factors. For example, in one or more embodiments, the method 900 includes determining the engagement scores for the plurality of products based on a combination of two or more of: user-ratings received in connection with the plurality of posts, a number of detected messages in connection with the plurality of posts sent to a content creator associated with sharing the posts, a detected number of comments by users of the networking system 104 received in response to the plurality of posts, and tracked user-interaction with respect to the plurality of products appearing within the plurality of posts.

As further shown in FIG. 9, the method 900 includes an act 950 of generating a creation insight including an identification of two or more products predicted to engage users of the networking system 104. In particular, in one or more embodiments, the act 950 includes generating, based on the engagement scores for the plurality of products, a creation insight including an identification of two or more products from the collection of products predicted to engage users of the networking system 104.

In one or more embodiments, the creation insight includes an identification of two or more products from the collection of products not included within the identified plurality of products. In one or more embodiments, the creation insight includes an identification of two or more products included within the identified plurality of products.

In one or more embodiments, the method 900 includes providing, via a graphical user interface of the networking system 104, an insight interface comprising digital content items associated with the identified two or more products. In one or more embodiments, the digital content items include user-generated digital content items associated with the two or more products, the user-generated digital content items originating from users of the networking system 104 unaffiliated with the two or more products.

In one or more embodiments, the method 900 includes searching a content database of a content creator associated with sharing the plurality of posts where the content database includes a storage space comprising a plurality of user-generated digital content items. The method 900 further includes identifying, from the content database, a user-generated digital content items from the plurality of user-generated digital content items associated with the two or more products from the collection of products. In one or more embodiments, the method 900 further includes providing, via a graphical user interface of the networking system 104, an insight interface comprising the identified two or more products and the identified user-generated digital content item associated with the two or more products. In one or more embodiments, searching the content database includes searching a local storage of a client device associated with the content creator.

In one or more embodiments, the method 900 includes generating, generating, based on the engagement scores for the plurality of products. In one or more embodiments, the second creation insight includes an identification of two or more different products from the collection of products predicted to engage users of the networking system 104. For example, in one or more embodiments, the method 900 includes generating a second creation insight including an identification of two or more different products predicted to engage a different demographic of users than the first creation insight.

Figure 10:
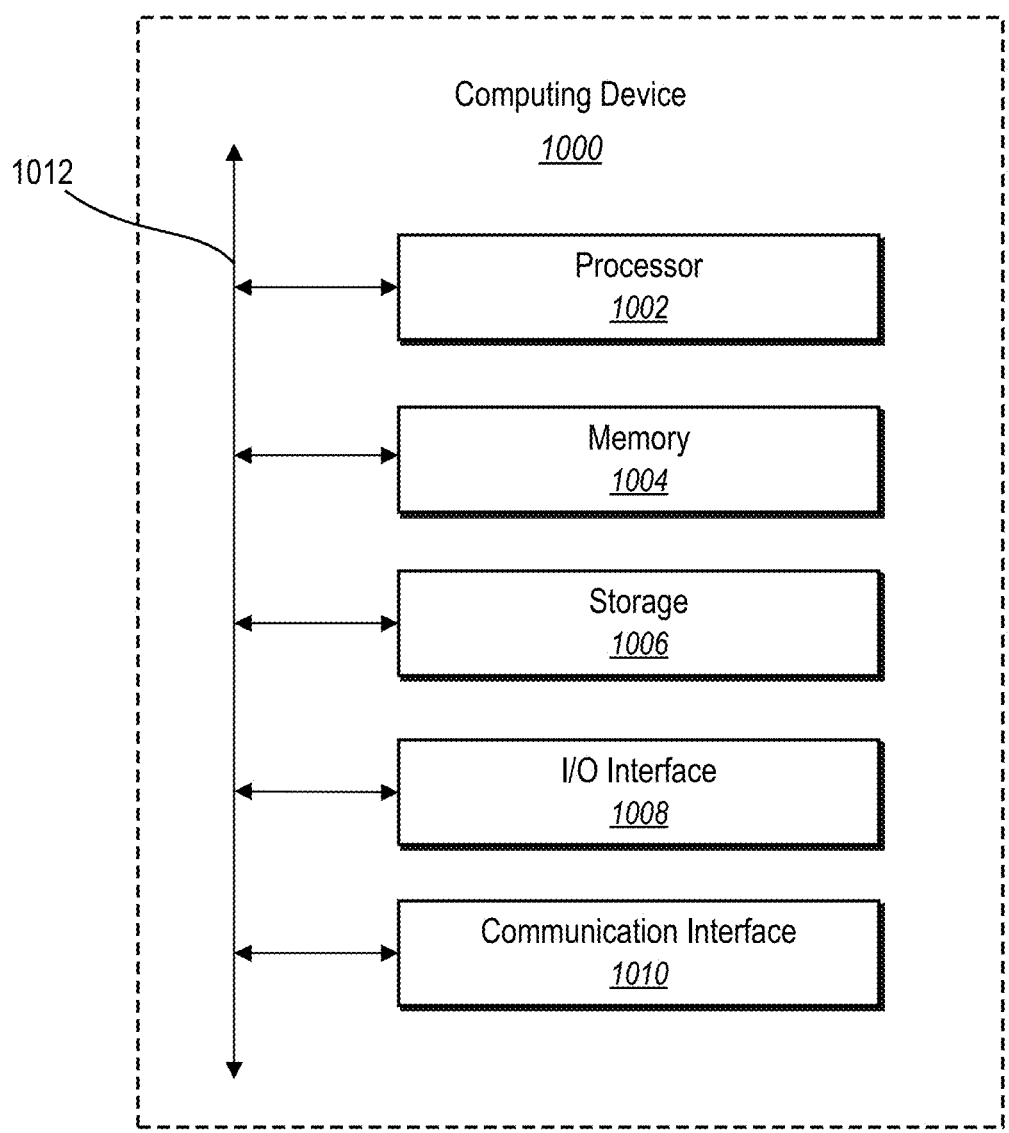
FIG. 10 illustrates a block diagram of an example computing device in accordance with one or more embodiments.

FIG. 10 illustrates, in block diagram form, an exemplary computing device 1000 that may be configured to perform one or more of the processes described above. In one or more embodiments, the client devices 106a-n, the server device(s) 102, and merchant device(s) 112 each comprise one or more computing devices in accordance with implementations of computing device 1000. As shown by FIG. 10, the computing device can comprise a processor 1002, a memory 1004, a storage device 1006, an I/O interface 1008, and a communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, a computing device 1000 can include fewer components than those shown in FIG. 10. Components of computing device 1000 shown in FIG. 10 will now be described in additional detail.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular embodiments, processor 1002 may include one or more internal caches for data, instructions, or addresses. As an example and not by way of limitation, processor 1002 may include one or more instruction caches, one or more data caches, and one or more translation lookaside buffers (TLBs). Instructions in the instruction caches may be copies of instructions in memory 1004 or storage 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1004 may be internal or distributed memory.

Storage device 1006 includes storage for storing data or instructions. As an example and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to the computing device 1000. In particular embodiments, storage device 1006 is non-volatile, solid-state memory. In other embodiments, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 1012 may include hardware, software, or both that couples components of computing device 1000 to each other. As an example and not by way of limitation, communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, in one or more embodiments, the networking system 104 is linked to and/or is implemented a social networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in to a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 11:
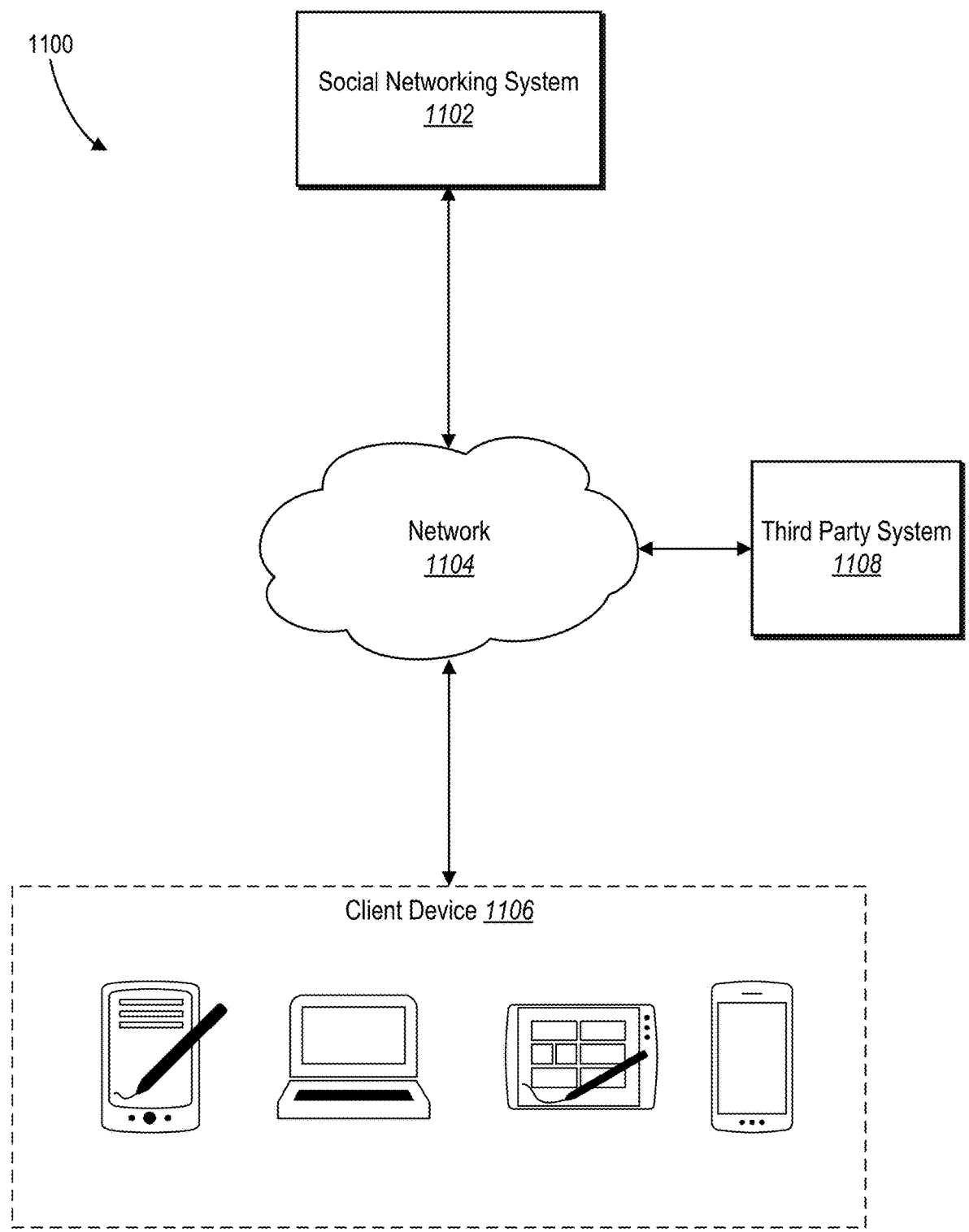
FIG. 11 illustrates an example network environment of a social networking system in accordance with one or more embodiments.

FIG. 11 illustrates an example network environment 1100 of a social-networking system. In particular embodiments, a social-networking system 1102 may comprise one or more data stores. In particular embodiments, the social-networking system 1102 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 1102 may comprise one or more computing devices (e.g., servers) hosting functionality directed to operation of the social-networking system 1102. A user of the social-networking system 1102 may access the social-networking system 1102 using a client device such as client device 1106. In particular embodiments, the client device 1106 can interact with the social-networking system 1102 through a network 1104.

The client device 1106 may be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1106 may access the social-networking system 1102.

While these methods, systems, and user interfaces utilize both publicly available information as well as information provided by users of the social-networking system, all use of such information is to be explicitly subject to all privacy settings of the involved users and the privacy policy of the social-networking system as a whole.

Figure 12:
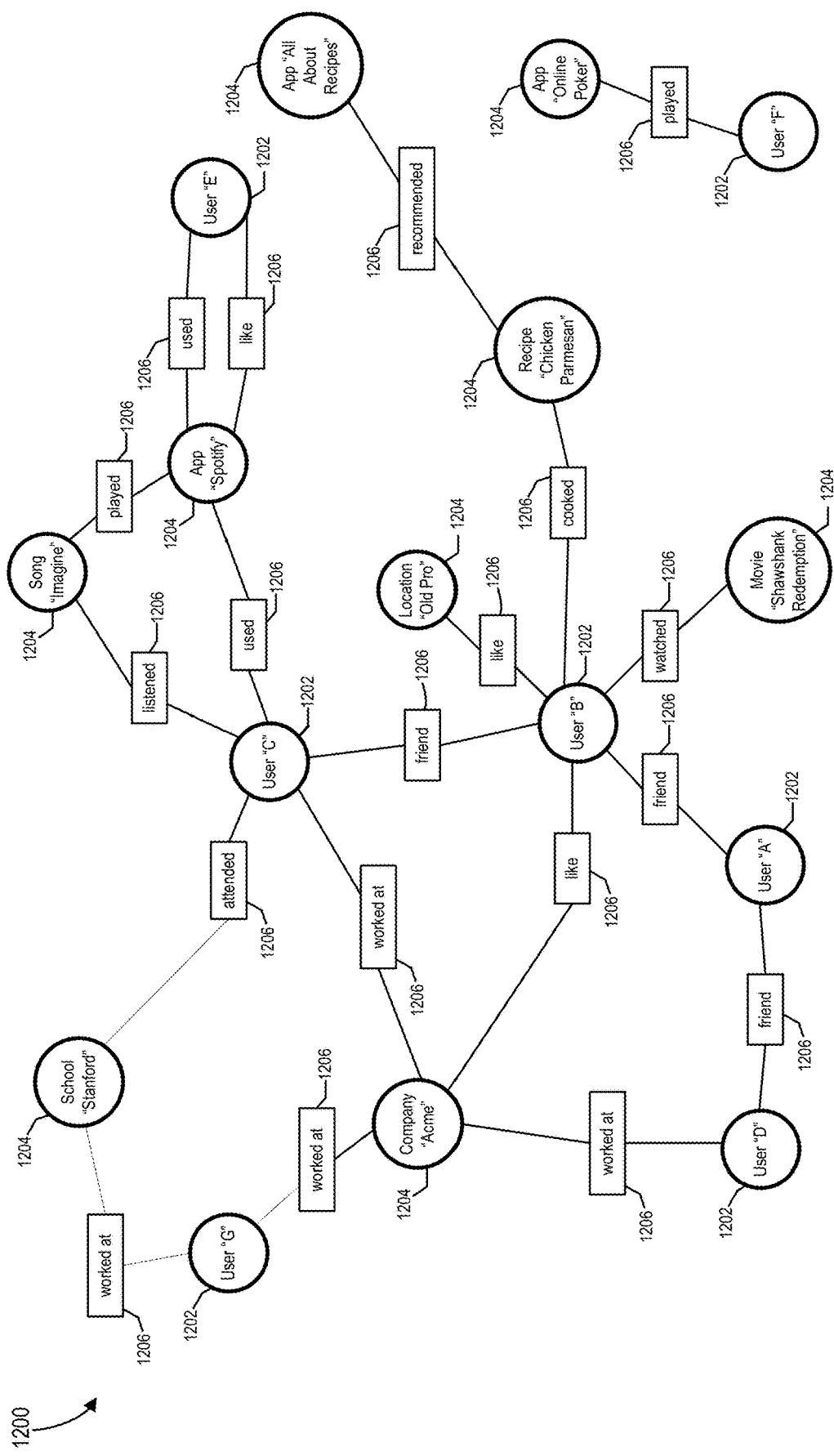
FIG. 12 illustrates a social graph in accordance with one or more embodiments.

FIG. 12 illustrates example social graph 1200. In particular embodiments, social networking system 1102 may store one or more social graphs 1200 in one or more data stores. In particular embodiments, social graph 1200 may include multiple nodes—which may include multiple user nodes 1202 or multiple concept nodes 1204—and multiple edges 1206 connecting the nodes. Example social graph 1200 illustrated in FIG. 12 is shown, for didactic purposes, in a two-dimensional visual map representation. In particular embodiments, a social networking system 1102, client device 1106, or third-party system 1108 may access social graph 1200 and related social-graph information for suitable applications. The nodes and edges of social graph 1200 may be stored as data objects, for example, in a data store (such as a social-graph database). Such a data store may include one or more searchable or query able indexes of nodes or edges of social graph 1200.

In particular embodiments, a user node 1202 may correspond to a user of social networking system 1102. As an example and not by way of limitation, a user may be an individual (human user), an entity (e.g., an enterprise, business, or third-party application), or a group (e.g., of individuals or entities) that interacts or communicates with or over social networking system 1102. In particular embodiments, when a user registers for an account with social networking system 1102, social networking system 1102 may create a user node 1202 corresponding to the user, and store the user node 1202 in one or more data stores. Users and user nodes 1202 described herein may, where appropriate, refer to registered users and user nodes 1202 associated with registered users. In addition or as an alternative, users and user nodes 1202 described herein may, where appropriate, refer to users that have not registered with social networking system 1102. In particular embodiments, a user node 1202 may be associated with information provided by a user or information gathered by various systems, including social networking system 1102. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1204 may correspond to a concept. As an example and not by way of limitation, a concept may correspond to a place (such as, for example, a movie theater, restaurant, landmark, or city); a website (such as, for example, a website associated with social-network system 1102 or a third-party website associated with a web-application server); an entity (such as, for example, a person, business, group, sports team, or celebrity); a resource (such as, for example, an audio file, video file, digital photo, text file, structured document, or application) which may be located within social networking system 1102 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1204 may be associated with information of a concept provided by a user or information gathered by various systems, including social networking system 1102. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1204 may be associated with one or more data objects corresponding to information associated with concept node 1204. In particular embodiments, a concept node 1204 may correspond to one or more webpages.

In particular embodiments, a node in social graph 1200 may represent or be represented by a webpage (which may be referred to as a "profile page"). Profile pages may be hosted by or accessible to social networking system 1102. Profile pages may also be hosted on third-party websites associated with a third-party system 1108. As an example and not by way of limitation, a profile page corresponding to a particular external webpage may be the particular external webpage and the profile page may correspond to a particular concept node 1204. Profile pages may be viewable by all or a selected subset of other users. As an example and not by way of limitation, a user node 1202 may have a corresponding user-profile page in which the corresponding user may add content, make declarations, or otherwise express himself or herself. As another example and not by way of limitation, a concept node 1204 may have a corresponding concept-profile page in which one or more users may add content, make declarations, or express themselves, particularly in relation to the concept corresponding to concept node 1204.

In particular embodiments, a concept node 1204 may represent a third-party webpage or resource hosted by a third-party system 1108. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 1106 to send to social networking system 1102 a message indicating the user's action. In response to the message, social networking system 1102 may create an edge (e.g., an "eat" edge) between a user node 1202 corresponding to the user and a concept node 1204 corresponding to the third-party webpage or resource and store edge 1206 in one or more data stores.

In particular embodiments, a pair of nodes in social graph 1200 may be connected to each other by one or more edges 1206. An edge 1206 connecting a pair of nodes may represent a relationship between the pair of nodes. In particular embodiments, an edge 1206 may include or represent one or more data objects or attributes corresponding to the relationship between a pair of nodes. As an example and not by way of limitation, a first user may indicate that a second user is a "friend" of the first user. In response to this indication, social networking system 1102 may send a "friend request" to the second user. If the second user confirms the "friend request," social networking system 1102 may create an edge 1206 connecting the first user's user node 1202 to the second user's user node 1202 in social graph 1200 and store edge 1206 as social-graph information in one or more of data stores. In the example of FIG. 12, social graph 1200 includes an edge 1206 indicating a friend relation between user nodes 1202 of user "A" and user "B" and an edge indicating a friend relation between user nodes 1202 of user "C" and user "B." Although this disclosure describes or illustrates particular edges 1206 with particular attributes connecting particular user nodes 1202, this disclosure contemplates any suitable edges 1206 with any suitable attributes connecting user nodes 1202. As an example and not by way of limitation, an edge 1206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1200 by one or more edges 1206.

In particular embodiments, an edge 1206 between a user node 1202 and a concept node 1204 may represent a particular action or activity performed by a user associated with user node 1202 toward a concept associated with a concept node 1204. As an example and not by way of limitation, as illustrated in FIG. 12, a user may "like," "attended," "played," "listened," "cooked," "worked at," or "watched" a concept, each of which may correspond to an edge type or subtype. A concept-profile page corresponding to a concept node 1204 may include, for example, a selectable "check in" icon (such as, for example, a clickable "check in" icon) or a selectable "add to favorites" icon. Similarly, after a user clicks these icons, social networking system 1102 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 1102 may create a "listened" edge 1206 and a "used" edge (as illustrated in FIG. 12) between user nodes 1202 corresponding to the user and concept nodes 1204 corresponding to the song and application to indicate that the user listened to the song and used the application. Moreover, social networking system 1102 may create a "played" edge 1206 (as illustrated in FIG. 12) between concept nodes 1204 corresponding to the song and the application to indicate that the particular song was played by the particular application. In this case, "played" edge 1206 corresponds to an action performed by an external application (SPOTIFY) on an external audio file (the song "Imagine"). Although this disclosure describes particular edges 1206 with particular attributes connecting user nodes 1202 and concept nodes 1204, this disclosure contemplates any suitable edges 1206 with any suitable attributes connecting user nodes 1202 and concept nodes 1204. Moreover, although this disclosure describes edges between a user node 1202 and a concept node 1204 representing a single relationship, this disclosure contemplates edges between a user node 1202 and a concept node 1204 representing one or more relationships. As an example and not by way of limitation, an edge 1206 may represent both that a user likes and has used at a particular concept. Alternatively, another edge 1206 may represent each type of relationship (or multiples of a single relationship) between a user node 1202 and a concept node 1204 (as illustrated in FIG. 12 between user node 1202 for user "E" and concept node 1204 for "SPOTIFY").

In particular embodiments, social networking system 1102 may create an edge 1206 between a user node 1202 and a concept node 1204 in social graph 1200. As an example and not by way of limitation, a user viewing a concept-profile page (such as, for example, by using a web browser or a special-purpose application hosted by the user's client device 1106) may indicate that he or she likes the concept represented by the concept node 1204 by clicking or selecting a "Like" icon, which may cause the user's client device 1106 to send to social networking system 1102 a message indicating the user's liking of the concept associated with the concept-profile page. In response to the message, social networking system 1102 may create an edge 1206 between user node 1202 associated with the user and concept node 1204, as illustrated by "like" edge 1206 between the user and concept node 1204. In particular embodiments, social networking system 1102 may store an edge 1206 in one or more data stores. In particular embodiments, an edge 1206 may be automatically formed by social networking system 1102 in response to a particular user action. As an example and not by way of limitation, if a first user uploads a picture, watches a movie, or listens to a song, an edge 1206 may be formed between user node 1202 corresponding to the first user and concept nodes 1204 corresponding to those concepts. Although this disclosure describes forming particular edges 1206 in particular manners, this disclosure contemplates forming any suitable edges 1206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 1102). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 1102 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 1102) or RSVP (e.g., through social networking system 1102) to an event associated with the advertisement. In addition or as an alternative, an advertisement may include social-networking-system context directed to the user. As an example and not by way of limitation, an advertisement may display information about a friend of the user within social networking system 1102 who has taken an action associated with the subject matter of the advertisement.

In particular embodiments, social networking system 1102 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 1102 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 1102 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 250%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 1102 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 1102 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 1102 may calculate a coefficient based on a user's actions. Social networking system 1102 may monitor such actions on the online social network, on a third-party system 1108, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 1102 may calculate a coefficient based on the user's actions with particular types of content. The content may be associated with the online social network, a third-party system 1108, or another suitable system. The content may include users, profile pages, posts, news stories, headlines, instant messages, chat room conversations, emails, advertisements, pictures, video, music, other suitable objects, or any combination thereof. Social networking system 1102 may analyze a user's actions to determine whether one or more of the actions indicate an affinity for subject matter, content, other users, and so forth. As an example and not by way of limitation, if a user may make frequently posts content related to "coffee" or variants thereof, social networking system 1102 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 1102 may calculate a coefficient based on the type of relationship between particular objects. Referencing the social graph 1200, social networking system 1102 may analyze the number and/or type of edges 1206 connecting particular user nodes 1202 and concept nodes 1204 when calculating a coefficient. As an example and not by way of limitation, user nodes 1202 that are connected by a spouse-type edge (representing that the two users are married) may be assigned a higher coefficient than a user nodes 1202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 1102 may determine that the user has a higher coefficient with respect to the first photo than the second photo because having a tagged-in-type relationship with content may be assigned a higher weight and/or rating than having a like-type relationship with content. In particular embodiments, social networking system 1102 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 1102 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1200. As an example and not by way of limitation, social-graph entities that are closer in the social graph 1200 (i.e., fewer degrees of separation) may have a higher coefficient than entities that are further apart in the social graph 1200.

In particular embodiments, social networking system 1102 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 1106 of the user). A first user may be more interested in other users or concepts that are closer to the first user. As an example and not by way of limitation, if a user is one mile from an airport and two miles from a gas station, social networking system 1102 may determine that the user has a higher coefficient for the airport than the gas station based on the proximity of the airport to the user.

In particular embodiments, social networking system 1102 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 1102 may provide information that is relevant to user's interests and current circumstances, increasing the likelihood that they will find such information of interest. In particular embodiments, social networking system 1102 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 1102 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 1102 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1108 (e.g., via an API or other communication channel), or from another suitable system. In response to the request, social networking system 1102 may calculate the coefficient (or access the coefficient information if it has previously been calculated and stored). In particular embodiments, social networking system 1102 may measure an affinity with respect to a particular process. Different processes (both internal and external to the online social network) may request a coefficient for a particular object or set of objects. Social networking system 1102 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 8, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1204 corresponding to a particular photo may have a privacy setting specifying that the photo may only be accessed by users tagged in the photo and their friends. In particular embodiments, privacy settings may allow users to opt in or opt out of having their actions logged by social networking system 1102 or shared with other systems (e.g., third-party system 1108). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 1102 may send a request to the data store for the object. The request may identify the user associated with the request and may only be sent to the user (or a client device 1106 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

The invention claimed is:

1. A method comprising:
posting, from a user account for a user of a social networking system for display on computing devices of social networking users, social networking posts comprising digital content items depicting products;
identifying, from a product catalog corresponding to the user account, the products depicted within the social networking posts;
tracking interactions between the social networking users and the social networking posts comprising the digital content items depicting the products;
determining, for a social networking post depicting a product from the product catalogue, an engagement score indicating one or more social networking users are predicted to engage with the social networking post depicting the product based on the tracked interactions between the social networking users and the social networking posts comprising the digital content items depicting the products; and
providing the product for display within an insight user interface for the user account based on the engagement score.

2. The method of claim 1, wherein:
determining the engagement score comprises determining a combination engagement score indicating the one or more social networking users are predicted to engage with the social networking post depicting a combination of the product and an additional product from the product catalog based on the tracked interactions between the social networking users and the social networking posts; and
providing the product for display within the insight user interface for the user account comprises providing the combination of the product and the additional product for display within the insight user interface based on the combination engagement score indicating the one or more social networking users are predicted to engage with the social networking post depicting the combination of the product and the additional product.

3. The method of claim 1, wherein providing the product for display within the insight user interface for the user account comprises providing, for display within the insight user interface for the user account, the product shown within a user-generated-digital-content item shared by another user of the social networking system.

4. The method of claim 1, further comprising recommending that the social networking post include the product shown in a digital content item stored on a client device associated with the user account.

5. The method of claim 1, wherein the engagement score further indicates a demographic group of users of the social networking system are predicted to engage within the social networking post.

6. The method of claim 1, wherein the tracked interactions between the social networking users and the social networking posts comprise comments associated with one or more of the social networking posts shared by the user account.

7. The method of claim 1, wherein the tracked interactions between the social networking users and the social networking posts comprise one or more of:
- users following the user account after viewing one of the social networking posts shared by the user account;
- users reacting to one of the social networking posts shared by the user account; or
- users sharing one of the social networking posts within the social networking system.

8. A non-transitory computer readable storage medium comprising instructions that, when executed by at least one processor, cause a computing system to:
- post, from a user account for a user of a social networking system for display on computing devices of social networking users, social networking posts comprising digital content items depicting products;
- identify, from a product catalog corresponding to the user account, the products depicted within the social networking posts;
- track interactions between the social networking users and the social networking posts comprising the digital content items depicting the products;
- determine, for a social networking post depicting a product from the product catalogue, an engagement score indicating one or more social networking users are predicted to engage with the social networking post depicting the product based on the tracked interactions between the social networking users and the social networking posts comprising the digital content items depicting the products; and
- provide the product for display within an insight user interface for the user account based on the engagement score.

9. The non-transitory computer readable storage medium of claim 8, further comprising instructions that, when executed by the at least one processor, cause the computing system to provide, for display within the insight user interface for the user account, the product shown within a user-generated-digital-content item shared by another user of the social networking system.

10. The non-transitory computer readable storage medium of claim 8, further comprising instructions that, when executed by the at least one processor, cause the computing system to recommend that the social networking post include the product shown in a digital content item stored on a client device associated with the user account.

11. The non-transitory computer readable storage medium of claim 8, further comprising instructions that, when executed by the at least one processor, cause the computing system to:
- determine the engagement score by determining a combination engagement score indicating the one or more social networking users are predicted to engage with the social networking post depicting a combination of the product and an additional product from the product catalog based on the tracked interactions between the social networking users and the social networking posts; and
- provide the product for display within the insight user interface for the user account by providing the combination of the product and the additional product for display within the insight user interface based on the combination engagement score indicating the one or more social networking users are predicted to engage with the social networking post depicting the combination of the product and the additional product.

12. The non-transitory computer readable storage medium of claim 8, wherein the engagement score further indicates a demographic group of users of the social networking system are predicted to engage within the social networking post.

13. The non-transitory computer readable storage medium of claim 8, wherein the engagement score is specific to a category of products.

14. The non-transitory computer readable storage medium of claim 8, wherein the tracked interactions between the social networking users and the social networking posts comprises one or more of:
- comments associated with one or more of the social networking posts shared by the user account;
- users following the user account after viewing one of the social networking posts shared by the user account;
- users reacting to one of the social networking posts shared by the user account; or users sharing one of the social networking posts within the networking system.

15. The non-transitory computer readable storage medium of claim 8, wherein the tracked interactions between the social networking users and the social networking posts comprises or more of:
- ratings of a social-networking page for the user account by one or more users of the social networking system after viewing one of the social networking posts shared by the user account; or
- messages to the user account from one or more users of the social networking system after viewing one of the social networking posts shared by the user account.

16. A system comprising:
- at least one processor; and
- at least one non-transitory computer readable storage medium comprising instructions that, when executed by at least one processor, cause the system to:
  - post, from a user account for a user of a social networking system for display on computing devices of social networking users, social networking posts comprising digital content items depicting products;
  - identify, from a product catalog corresponding to the user account, the products depicted within a social networking posts;
  - track interactions between the social networking users and the social networking posts comprising the digital content items depicting the products;
  - determine, for a social networking post depicting a product from the product catalogue, an engagement score indicating one or more social networking users are predicted to engage with the social networking post depicting the product based on the tracked interactions between the social networking users and the social networking posts comprising the digital content items depicting the products; and
  - provide the product for display within an insight user interface for the user account based on the engagement score.

17. The system of claim 16, further comprising instructions that, when executed by the at least one processor, cause the system to provide, for display within the insight user interface for the user account, the product shown within a user-generated-digital-content item shared by another user of the social networking system.

18. The system of claim 16, further comprising instructions that, when executed by the at least one processor, cause the system to recommend that the social networking post include the product shown in a digital content item stored on a client device associated with the user account.

19. The system of claim 16, further comprising instructions that, when executed by the at least one processor, cause the system to:

determine the engagement score by determining a combination engagement score indicating the one or more social networking users are predicted to engage with the social networking post depicting a combination of the product and an additional product from the product catalog based on the tracked interactions between the social networking users and the social networking posts; and provide the product for display within the insight user interface for the user account by providing the combination of the product and the additional product for display within the insight user interface based on the combination engagement score indicating the one or more social networking users are predicted to engage with the social networking post depicting the combination of the product and the additional product.

20. The system of claim 16, wherein the tracked interactions between the social networking users and the social networking posts comprises one or more of:

comments associated with one or more of the social networking posts shared by the user account;

users following the user account after viewing one of the social networking posts shared by the user account;

users reacting to one of the social networking posts shared by the user account; or users sharing one of the social networking posts within the networking system.

* * * * *